(12) United States Patent
Jitaru et al.

(10) Patent No.: US 12,132,397 B2
(45) Date of Patent: Oct. 29, 2024

(54) POWER TRANSFORMER FOR MINIMUM NOISE INJECTION IN BETWEEN PRIMARY AND SECONDARY WINDING "ROMPOWER ACTIVE SHIELD"

(71) Applicant: Rompower Technology Holdings, LLC, Milford, DE (US)

(72) Inventors: Ionel Jitaru, Tucson, AZ (US); Mihai Bogdan Jitariu, Neamt (RO); Andrei Stefan Savu, Buchare (RO)

( * ) Notice: Subject to any disclaimer, the term of this patent is extended or adjusted under 35 U.S.C. 154(b) by 295 days.

(21) Appl. No.: 17/845,963

(22) Filed: Jun. 21, 2022

(65) Prior Publication Data

US 2022/0320998 A1  Oct. 6, 2022

Related U.S. Application Data

(63) Continuation-in-part of application No. 16/732,240, filed on Dec. 31, 2019, now Pat. No. 11,374,499.

(60) Provisional application No. 63/213,107, filed on Jun. 21, 2021, provisional application No. 62/787,199, filed on Dec. 31, 2018.

(51) Int. Cl.
   *H02M 1/44*       (2007.01)
   *H02M 3/335*      (2006.01)

(52) U.S. Cl.
   CPC ............. *H02M 1/44* (2013.01); *H02M 3/335* (2013.01)

(58) Field of Classification Search
   CPC .................................................. H02M 1/44
   See application file for complete search history.

(56) References Cited

U.S. PATENT DOCUMENTS

| | | | | |
|---|---|---|---|---|
| 9,129,736 | B2* | 9/2015 | Zhou | H01F 27/2885 |
| 2004/0196668 | A1* | 10/2004 | Park | H01F 27/36 |
| | | | | 363/16 |
| 2013/0235619 | A1* | 9/2013 | Zhou | H01F 27/2885 |
| | | | | 363/21.04 |
| 2014/0334198 | A1* | 11/2014 | Yang | H01F 27/36 |
| | | | | 29/602.1 |
| 2016/0134195 | A1* | 5/2016 | Song | H01F 27/2804 |
| | | | | 363/21.12 |
| 2016/0181008 | A1* | 6/2016 | de Groot | H02M 7/217 |
| | | | | 363/127 |

\* cited by examiner

*Primary Examiner* — Alex Torres-Rivera
(74) *Attorney, Agent, or Firm* — Thomas W. Galvani, P.C.; Thomas W. Galvani

(57) ABSTRACT

A system for reducing common-mode noise includes a switch mode power supply having primary and secondary sides, primary and secondary side grounds, an input voltage source, a primary switch, a transformer, a core, and a power output. The primary and secondary sides each have a quiet termination. The transformer includes a primary winding, a secondary winding, and an active shield winding between the primary and secondary windings. The active shield winding has two terminations, is wound in a same direction as the secondary winding, and occupies a same axial position on the core as the secondary winding. One of the terminations of the active shield winding is connected to the quiet termination of the primary side, so that the terminations of the secondary winding and the active shield winding that are adjacent each other carry alternating voltages of a same polarity and a same amplitude.

20 Claims, 35 Drawing Sheets

1) $I'_n = 0$

2) $I'_1 = K\left(\Delta V_A - \Delta V_A \frac{N'_2}{N_1}\right)$

3) $I''_n = 0$

4) $I''_1 = K\left(\Delta V_A \frac{N'_2}{N_1} - \frac{\Delta V_A N_2}{N_1}\right)$ For $N'_2 = N_2$ $\rightarrow I''_1 = 0$

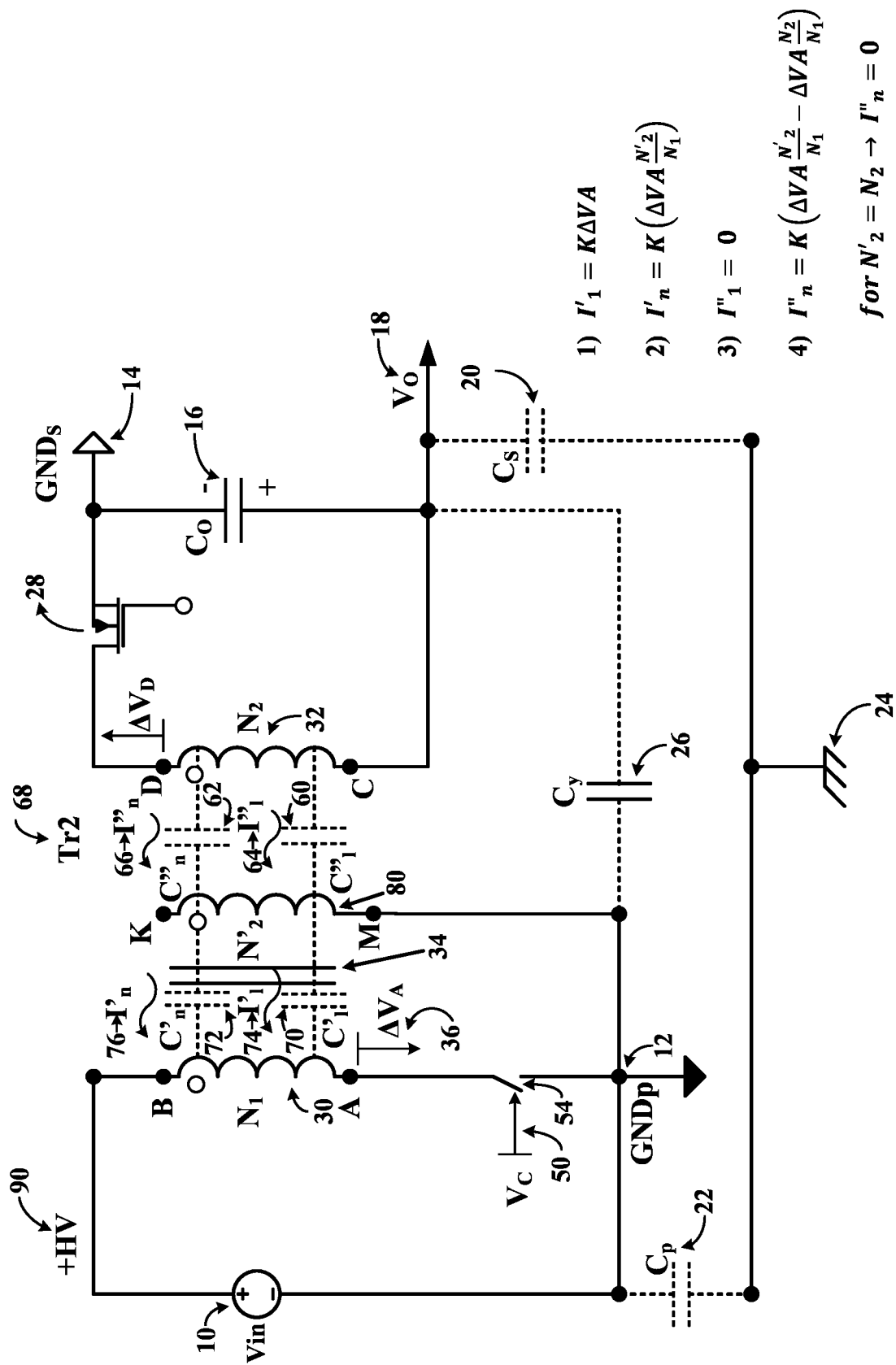

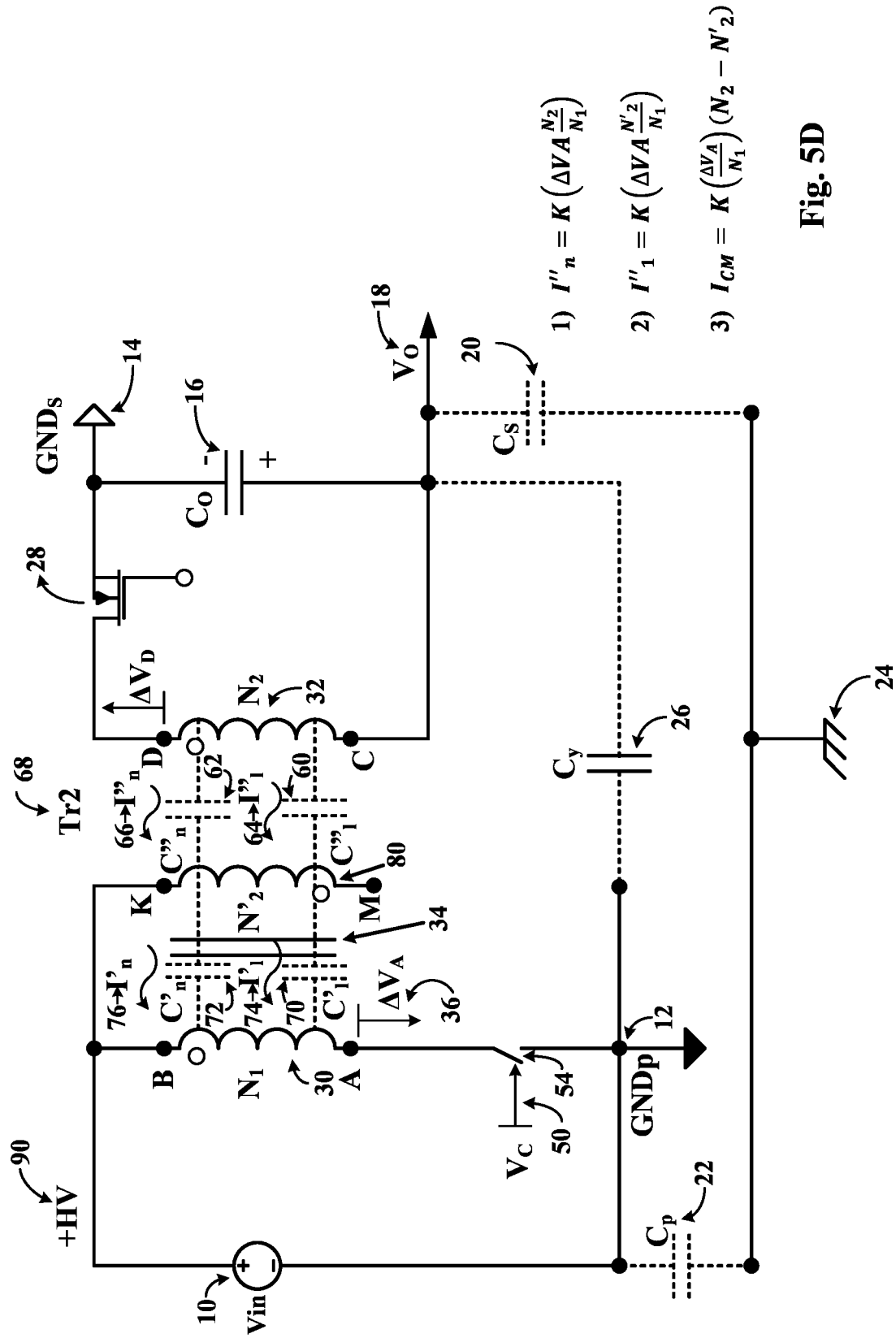

POWER TRANSFORMER FOR MINIMUM NOISE INJECTION IN BETWEEN PRIMARY AND SECONDARY WINDING "ROMPOWER ACTIVE SHIELD"

CROSS-REFERENCE TO RELATED APPLICATIONS

This application is a continuation in part of and claims the benefit of prior U.S. patent application Ser. No. 16/732,240, filed Dec. 31, 2019, which claims the benefit of U.S. Provisional Application No. 62/787,199, filed Dec. 31, 2018, both of which are hereby incorporated by reference. This application also claims the benefit of U.S. Provisional Application No. 63/213,107, filed Jun. 21, 2021, which is hereby incorporated by reference.

FIELD

This specification relates to power converters and in particular to the reduction of noise emissions or electromagnetic interference (EMI) in switch mode power supplies or other applications.

BACKGROUND

High Frequency noise, or Electro-Magnetic Interference (EMI), is generated by the switching elements in a power converter using an isolated power transformer, via the primary-secondary stray capacitances, either back to the line supplying the SMPS or into the load that it is powering. Such noise is also radiating and may affect any sensitive nearby components and circuits. There are strict conducted and radiated emission standards with which commercial devices have to comply.

Over the years, engineers developed many solutions to reduce interference generated by isolated switch mode power supplies which apply to common mode noise arising from capacitive coupling between windings and between magnetic core and windings associated with the transformer. Y capacitors are used between primary and secondary sides to bypass the noise. However, Y capacitors increase the earth leakage current which places a limit on the value of the Y capacitors.

Electrostatic shields are also used to provide a solution to the passage of noise via capacitive displacement currents through the stray capacitance coupling in the transformer. A shield is usually made of an incomplete turn foil or a bobbin-width wire winding. The common mode noise couples across the shield stray capacitance and returns to the circuit connected to the shield usually the primary ground.

In U.S. Pat. No. 5,990,776, Jitaru describes the problems associated with conventional shields, which include an increase of the parasitic capacitance across the primary winding and secondary winding. Jitaru proposes different techniques to minimize these drawbacks. Jitaru also offers some methodologies of shielding which can be applied in planar transformers. In planar transformers, the parasitic capacitances between windings are larger than those in conventional transformers due to the geometry of the windings. Jitaru also presents different methodologies for noise cancellation. Because the shield—or even multiple shields—between primary and secondary windings do not fully cancel the common mode current injected into the earth ground, cancellation methods of the residual noise have to be applied.

There are different methodologies used for the noise cancellation. Besides the methods suggested by Jitaru in the U.S. Pat. No. 5,990,776, there are other techniques such as the one presented in the U.S. Pat. No. 6,549,431. The solutions depicted there may increase the leakage inductance and add cost and complexity.

U.S. Pat. No. 5,724,236 presents a method of noise cancellation in which the classical shield is not connected to ground but to an auxiliary winding which injects a signal via the conventional shield into the secondary winding, a signal which is designed to be of opposite polarity of the residual noise.

U.S. Pat. No. 8,023,294 presents different methods of noise cancellation in which there is an auxiliary winding to provide noise suppression in antiphase to the common mode noise which reaches the secondary winding and the coupling of this cancellation signal to the secondary winding is not done through the shield placed in between primary and secondary, as in U.S. Pat. No. 5,724,236, but through other means such as an additional shield placed in vicinity of the secondary winding or through the magnetic core or even through the conductive strap placed around the magnetic core.

U.S. Pat. No. 5,107,411 presents a method of eliminating noise injection between primary and secondary without the use of a shield but rather by creating an ideal symmetry between the primary and secondary windings adjacent to each other and in which the primary and secondary winding adjacent to each other carry alternating voltages of the same polarity in the operating conditions. As a result, there is not displacement current through the parasitic capacitance between primary and secondary windings. This works well if the turns ratio in the transformer, which is the ratio between the members of turns in primary and secondary, is 1:1. In the case of different turn ratios, additional primary or secondary coils are required in the transformer. The solution from the above patent does not cover additional noise injection which can come through the magnetic core, layout and other coupling into the EMI filter.

SUMMARY

In an embodiment, a system for reducing common-mode noise includes a switch mode power supply including primary and secondary sides, primary and secondary side grounds, an input voltage source, a primary switch, a transformer, a core, and a power output, wherein the primary side and the secondary side each have a quiet termination wherein the voltage does not change with respect to the primary side ground and with respect to the secondary side ground. The transformer includes a primary winding on the primary side connected to the input voltage source via the primary switch, a secondary winding on the secondary side connected to the power output via a rectifier means, and an active shield winding placed between the primary and secondary windings, wherein the active shield winding has two terminations, is wound in a same direction as the secondary winding, and occupies a same axial position on the core as the secondary winding. The active shield winding and secondary winding each have a number of turns. One of the two terminations of the active shield winding is connected to the quiet termination of the primary side, so that the terminations of the secondary winding and the active shield winding that are adjacent each other carry alternating voltages of a same polarity and a same amplitude. In an embodiment, the number of turns of the active shield winding is the same as the number of turns of the secondary winding. In another embodiment, the number of turns of the active shield winding is different from the number of turns of the secondary winding, so as to induce a voltage into the secondary winding which has a polarity that is opposite a polarity of a residual common mode noise injected from the primary winding to the secondary winding.

In an embodiment, a system for reducing common-mode noise includes a switch mode power supply including primary and secondary sides, primary and secondary side grounds, an input voltage source, a primary switch, a transformer, a core, and a power output, wherein the primary side and the secondary side each have a quiet termination wherein the voltage does not change with respect to the primary side ground and with respect to the secondary side ground. The transformer includes a primary winding on the primary side connected to the input voltage source via the primary switch, a secondary winding on the secondary side connected to the power output via a rectifier means, and an active shield winding placed between the primary and secondary windings, wherein the active shield winding has two terminations, is wound in a same direction as the secondary winding, and occupies a same axial position on the core as the secondary winding. The active shield winding and secondary winding each have a number of turns. One of the two terminations of the active shield winding is connected to the quiet termination of the primary side, so that the terminations of the secondary winding and the active shield winding that are adjacent each other carry alternating voltages of an opposite polarity and a same amplitude. In an embodiment, the number of turns of the active shield winding is the same as the number of turns of the secondary winding. In another embodiment, the number of turns of the active shield winding is different from the number of turns of the secondary winding, so as to induce a voltage into the secondary winding which has a polarity that is opposite a polarity of a residual common mode noise injected from the primary winding to the secondary winding.

In an embodiment, a system for reducing common-mode noise includes a switch mode power supply including primary and secondary sides, primary and secondary side grounds, an input voltage source, a primary switch, a transformer, a core, and a power output, wherein the primary side and the secondary side each have a quiet termination wherein the voltage does not change with respect to the primary side ground and with respect to the secondary side ground. The transformer includes primary winding on the primary side connected to the input voltage source via the primary switch, a secondary winding on the secondary side connected to the power output via a rectifier means, and at least two active shield windings. The active shield windings are adjacent to the secondary winding on both sides of the secondary winding, are wound in a same direction as the secondary winding, occupy a same axial position on the core as the secondary winding, and each have two terminations. The active shield windings and the secondary windings each have a number of turns. One of the two terminations of each active shield winding is connected to the quiet termination of the primary side, so that the terminations of the secondary winding and the active shield windings that are adjacent each other carry alternating voltages of a same polarity and a same amplitude. In an embodiment, the number of turns of the active shield windings is the same as the number of turns of the secondary winding. In another embodiment, the number of turns of the active shield windings is different from the number of turns of the secondary winding, so as to induce a voltage into the secondary winding which has a polarity that is opposite a polarity of residual common mode noise injected from the primary winding to the secondary winding. In yet another embodiment, the transformer is implemented in a multilayer PCB and, on both sides of the secondary winding, windings on layers of the PCB that are adjacent to the secondary winding mirror the secondary winding and carry alternating voltages of a same polarity and same amplitude as the secondary winding. In still another embodiment, the windings on the layers of the PCB that are adjacent to the secondary winding are part of the primary winding.

In an embodiment, a system for reducing common-mode noise includes a switch mode power supply including primary and secondary sides, primary and secondary side grounds, an input voltage source, a primary switch, a transformer, a core, and a power output, wherein the primary side and the secondary side each have a quiet termination wherein the voltage does not change with respect to the primary side ground and with respect to the secondary side ground. The transformer includes primary winding on the primary side connected to the input voltage source via the primary switch, a secondary winding on the secondary side connected to the power output via a rectifier means, and at least two active shield windings. The active shield windings are adjacent to the secondary winding on both sides of the secondary winding, are wound in a same direction as the secondary winding, occupy a same axial position on the core as the secondary winding, and each have two terminations. The active shield windings and the secondary windings each have a number of turns. One of the two terminations of each active shield winding is connected to the quiet termination of the primary side, so that the terminations of the secondary winding and the active shield windings that are adjacent each other carry alternating voltages of an opposite polarity and a same amplitude. In an embodiment, the number of turns of the active shield windings is the same as the number of turns of the secondary winding. In another embodiment, the number of turns of the active shield windings is different from the number of turns of the secondary winding, so as to induce a voltage into the secondary winding which has a polarity that is opposite a polarity of residual common mode noise injected from the primary winding to the secondary winding.

In an embodiment, a system for reducing common-mode noise includes a switch mode power supply including primary and secondary sides, primary and secondary side grounds, an input voltage source, a primary switch, a multilayer PCB transformer having a planar magnetic core with multiple legs, and a power output, wherein the primary side and the secondary side each have a quiet termination wherein the voltage does not change with respect to the primary side ground and with respect to the secondary side ground. The transformer includes a primary winding on the primary side, which primary winding encircles the multiple legs of the planar magnetic core and is connected to the input voltage source via the primary switch of the power supply, and a secondary winding on the secondary side, which secondary winding encircles the multiple legs of the planar magnetic core and is connected to the power output via a rectifier means. The system further includes at least two active shield windings, wherein the active shield windings are adjacent to the secondary winding on both sides of the secondary winding, mirror the adjacent secondary winding, are wound in a same direction as the secondary winding, have a same number of turns as the secondary winding, and each have two terminations. One of the two terminations of each active shield winding is connected to the quiet termination of the primary side, so that the terminations of the secondary winding and the active shield windings that are adjacent each other carry alternating voltages of a same polarity and a same amplitude. In an embodiment, the active shield windings is connected to the quiet termination of the primary side via an auxiliary winding around one of the legs of the planar magnetic core, and the auxiliary winding induces a voltage into the active shield windings which has a polarity that is opposite a polarity of a residual common mode noise injected from the primary winding to the second winding.

The most traditional technique in preventing noise injection from the primary winding to the secondary winding of a transformer, technique used in switch mode power supply is the placement of an electrostatic shield formed by an incomplete turn of copper foil placed in between the primary winding and secondary winding. This electrostatic shield is usually connected to the input ground directly or via a ferrite bead or to the high voltage rail where the primary winding is connected in topologies such as flyback or single ended forward. In between the primary windings and also between secondary winding and the electrostatic shield there are parasitic capacitances which generate displacement currents during the operation. In this patent we will refer to one application of the isolated transformer which is a flyback converter though the methodology described in this patent can be applied to any transformer and any topology. Further, for simplicity we will present a simple non interleaved transformer structure having a primary winding and a secondary winding and in some cases some additional auxiliary windings. The embodiments of this patent application are applied to any transformer structure, such as interleaved or multiple interleaved wherein the primary and secondary windings are placed alternatively on the bobbin.

There are several ways the noise generated by the voltage swing across the primary switch in a flyback converter and actually in any power converter leads to displacements current into the secondary winding via the parasitic capacitances between primary and secondary winding. One path of the noise injection from primary to secondary winding is via the core of the transformer. The primary winding will inject noise into the magnetic core via the parasitic capacitance between the primary winding and the core and further via the magnetic core this noise is injected into the secondary winding. To address that it is common practice that in the power transformer to place a shield in between the magnetic core and the primary winding.

Another source of noise injection is caused by the secondary winding voltage swing, which generates displacement currents via the parasitic capacitance towards the copper shield and further into the primary ground where the shield is connected. Though the voltage swing in the secondary winding it is not as big in amplitude as the voltage swing in the primary winding in many applications, this source of noise can be still high to prevent the EMI test results to be within 6 dB under the EN 55022 class B limit, such is the case in this particular application. The embodiments presented in this patent will present solutions which will eliminate the noise injection from the secondary winding into the shield and further into the primary ground.

The above provides the reader with a summary of some embodiments described below. Simplifications and omissions are made, and the summary is not intended to limit, define, or focus the disclosure or claims in any way. Similarly, some parts of the detailed description and drawings are specifically summarized above, but nonetheless, the summary is not intended to limit, define, or focus the disclosure or claims in any way. Rather, this summary merely introduces the reader to some aspects of some embodiments in preparation for the detailed description that follows.

BRIEF DESCRIPTION OF THE DRAWINGS

Referring to the drawings:

FIG. 5A depicts a power train of a flyback converter with a "low side secondary rectifier" and an active shield;

FIG. 5B depicts equations associated with the circuit from FIG. 5A;

FIG. 5C depicts a power train of the flyback converter a "low side secondary rectifier" and an active shield, wherein the displacement current in between the active shield winding and the secondary winding is zero by injecting between the active shield winding and the secondary winding displacement currents of the same amplitude and opposite polarities;

FIG. 5D depicts equations associated with the circuit from FIG. 5C;

DETAILED DESCRIPTION

Figures 1A, 1B:
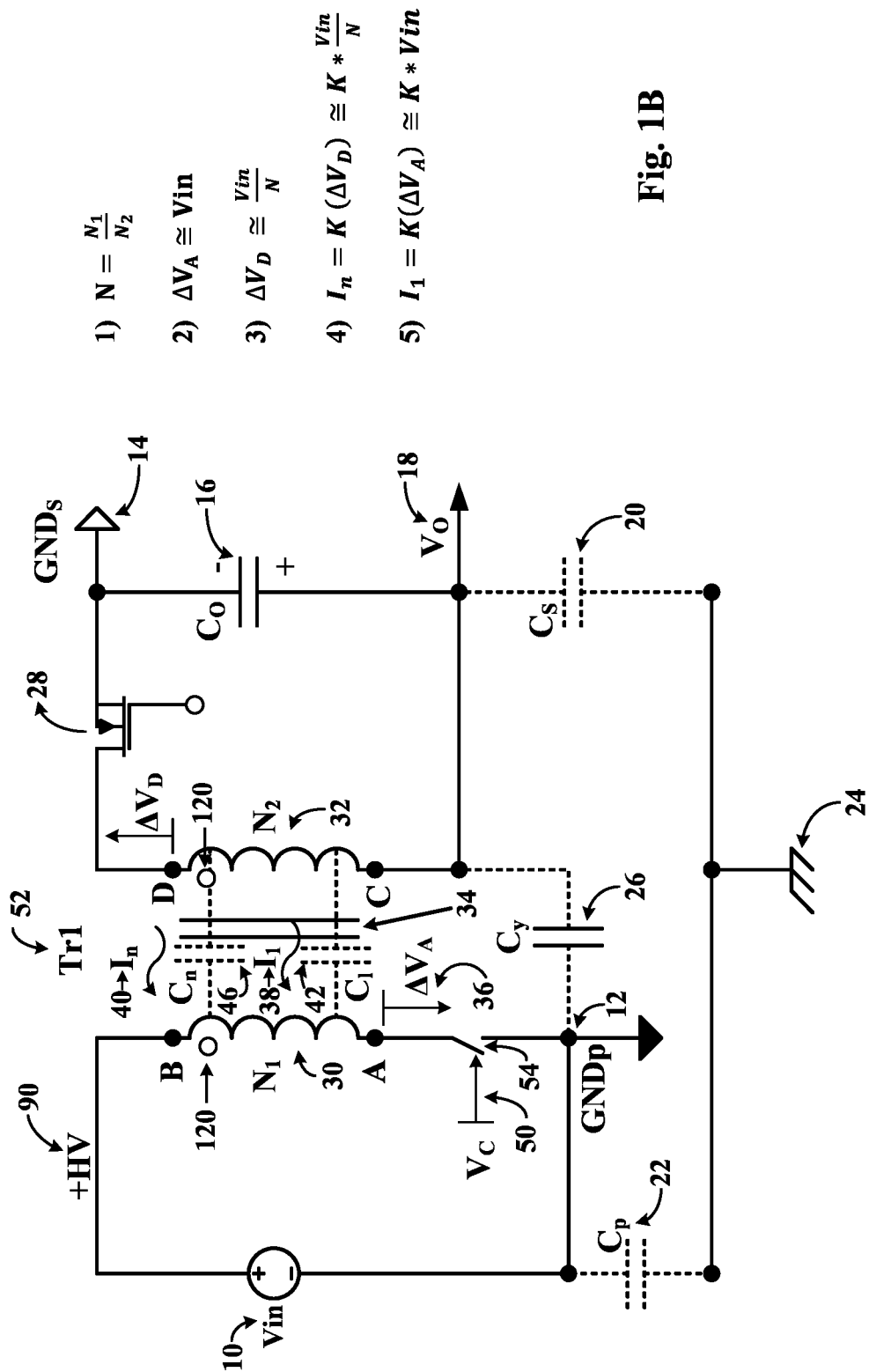
FIG. 1A depicts a power train of a flyback converter with a "low side secondary rectifier"
FIG. 1B depicts equations associated with the circuit from FIG. 1A.

In FIG. 1A is presented a flyback converter having an input voltage source, Vin, 10, a primary switch, 54, a control signal Vc, 50, which closes and opens the switch S, a transformer Tr1, 52, composed by a primary winding 30, a secondary winding 32, and a magnetic core 34. In the secondary there is a rectification means, 28, which can be a diode or a synchronized rectifier, and an output capacitor Co, 16. For simplicity in this specification the rectification means has a cathode and an anode. In the event a synchronized rectifier is used the cathode of the rectifier means is the drain of the Mosfet and the anode of the rectification means is the source of the Mosfet. There is a primary side ground, 12 and a secondary side ground, 14. In between primary side and secondary side there is a Y capacitor Cy, 26 and a parasitic capacitor Cp, 22, between the primary ground 12 and the electrical earth 24. There is a parasitic capacitor Cs between the secondary ground, 14 and the electrical earth, 24. In some cases this capacitance is shorted out by a direct electrical connection between the secondary ground and earth ground.

In between primary winding, 30 and secondary winding 32, there are parasitic capacitances. The model is simplified, using just two parasitic capacitances at the terminations of the primary and secondary windings, C1, 42 and Cn, 46.

Figure 2:
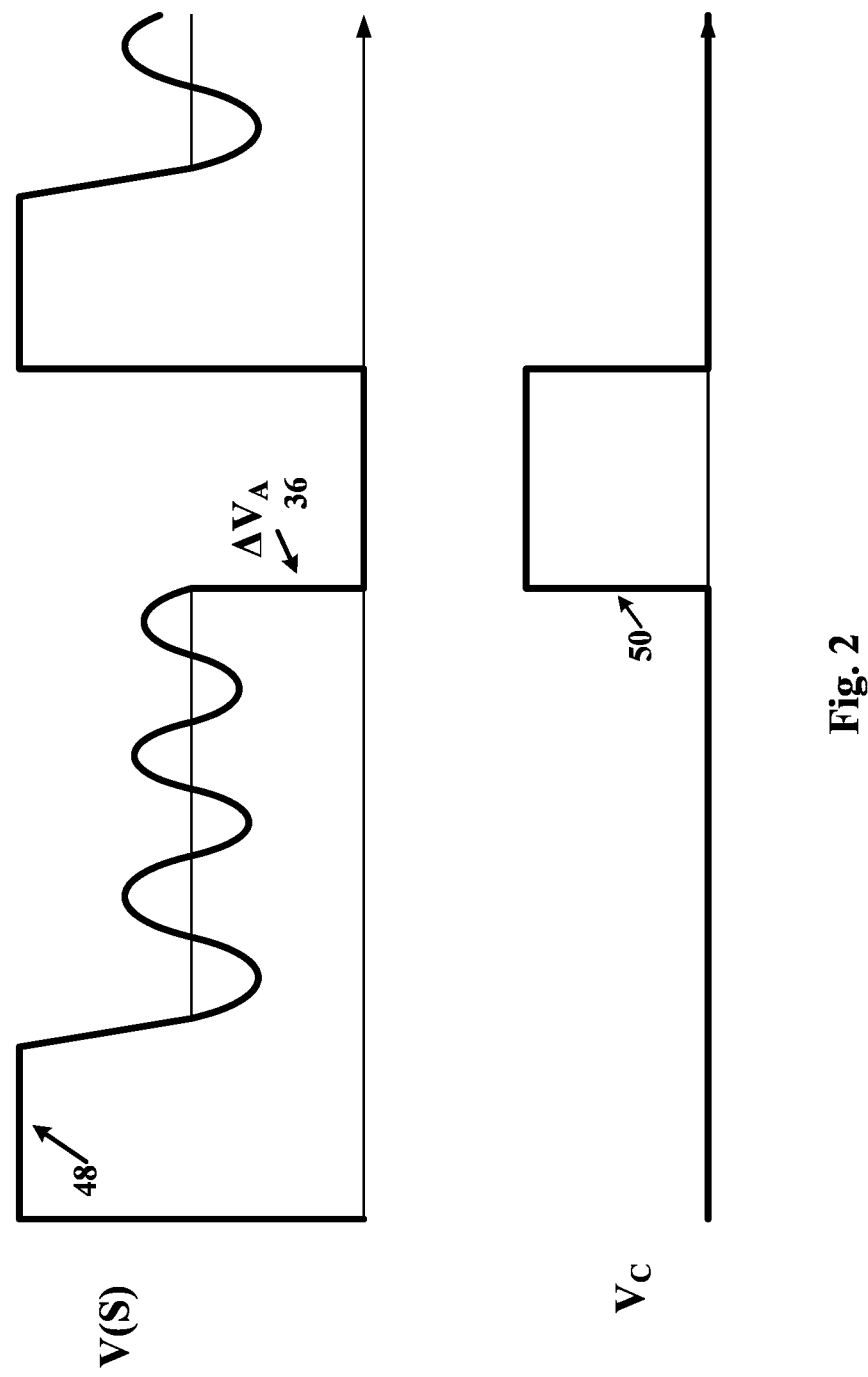
FIG. 2 depicts two waveforms from the circuit presented in FIG. 1A.

In FIG. 2 are presented two key waveforms in the flyback topology, V(S) which is the voltage across the primary switch S, and the control voltage Vc, 50. The voltage across the primary switch V(S) does have several transitions. For simplicity, focus on the transition when the primary switch is closed. At that time the voltage across S, 54, start decreasing from a high voltage level which in discontinuous mode flyback is the input voltage Vin, after the natural ringing caused by the resonance in between the inductance of the primary winding and the parasitic capacitance reflected across the primary switch, amortizes. The time interval when both switchers, S, 54 and the output rectification means, 28 are not conducting, is referred in this specification as dead time. The primary winding has two terminations, A and B. The termination A is connected to the primary switch S and the other termination B is connected to Vin. The secondary winding has also two terminations. One termination C is connected to the output voltage Vo, 18, and the other termination D is connected to the cathode of the rectifier means, 28.

When the primary switch S is closed the voltage in A, starts falling with a high voltage slope, and the voltage swing is ΔVA. The other end of the parasitic capacitor C1, 42, is connected to C and the voltage in C does not change in report to the secondary ground GNDs, 14. A current I1, 38, will start flowing through the capacitor C1, from the secondary ground, 14 via Co, and further through S towards the primary ground, 12. This is referred as a common mode current, which is minimized in order to meet the EMI requirements. On the other end of the primary winding, in B, the voltage does not change versus input ground, 12. On the other end of the parasitic capacitance Cn, 46, which is connected to D of the secondary winding the voltage will go up by a level AVD. As a result of the voltage swing in D, a current will start flowing through Cn, 46 which is part of the common mode noise between primary ground and secondary ground. There are many parasitic capacities between primary winding and secondary winding and the amplitude of the currents through these parasitic capacitances will be function of the voltage swings at each terminal versus input ground and respectively output ground. For simplicity, the focus is only on the parasitic capacitances C1, 42 and Cn, 46.

In FIG. 1B are presented the formulas describing the displacement current through the parasitic capacities C1, 42 and Cn, 46. In formula 4 and 5 of FIG. 1B shows that the displacement current In, and I1 are proportionate with the Vin. A constant K is introduced which is proportionate with the value of the parasitic capacitance C1 and Cn and the slope of the voltage change.

The circuit configuration of the flyback converter presented in FIG. 1A is referred in the field as a "low side secondary rectifier", when the anode of the rectifier means is connected to the secondary ground, 14.

In this configuration the dot, 120, in the secondary winding is placed to the cathode of the rectifier means. The dots placed in the windings of the transformer represent the polarity of the windings. When a voltage is applied to a winding in a transformer with the positive polarity at the dot, the rest of the winding will have a positive polarity induced at the dot as well.

In conclusion, in the configuration from FIG. 1, referred also as a "low side secondary rectifier" there is a displacement current through the parasitic capacitance between primary winding and secondary winding, displacement current described by the formula 4 and 5 from FIG. 1B. This displacement current is proportionate with Vin and also with the turn ratio.

Figures 3A, 3B:
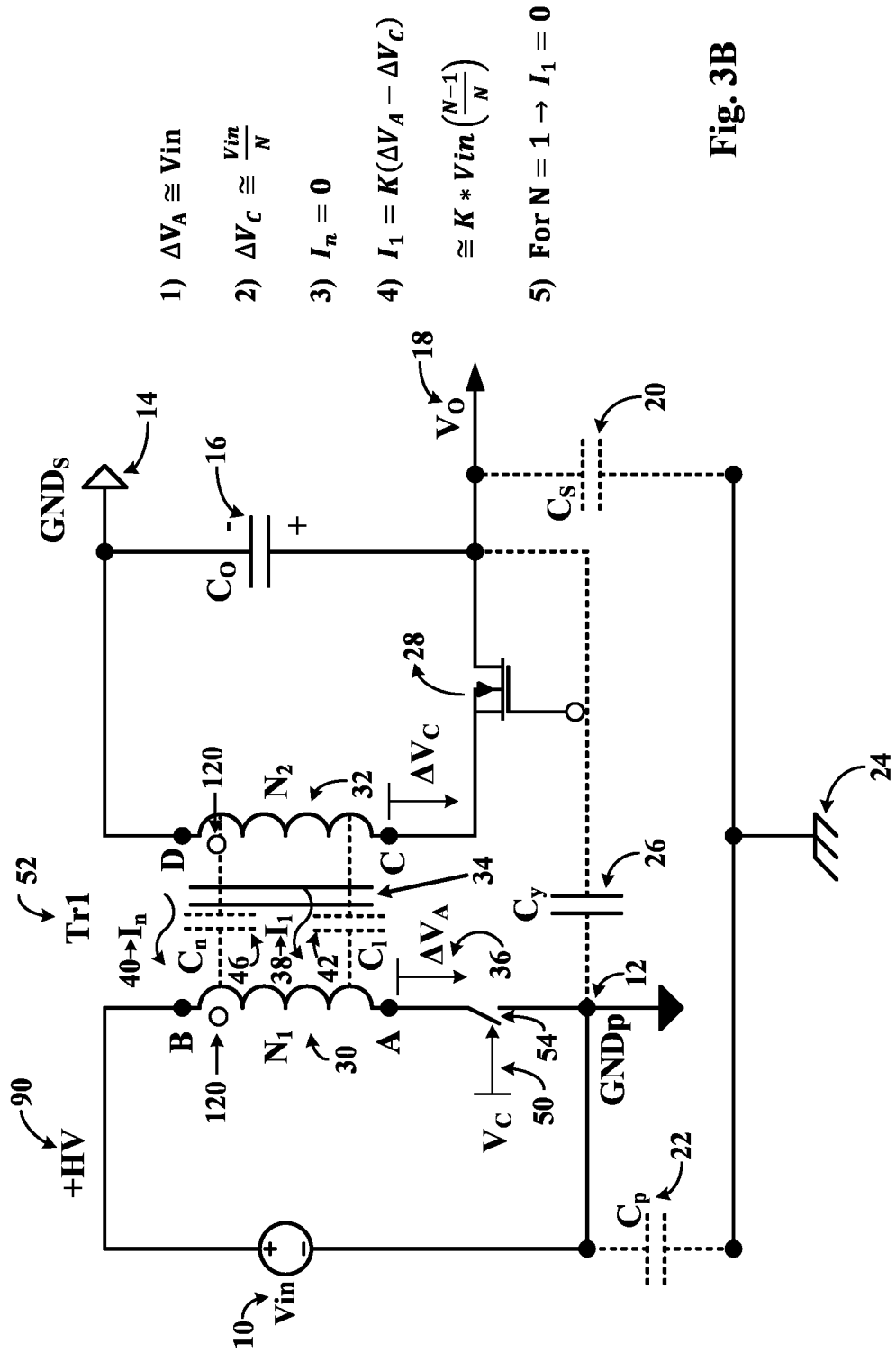
FIG. 3A depicts a power train of a flyback converter with a "high side secondary rectifier"
FIG. 3B depicts equations associated with the circuit from FIG. 3A.

In FIG. 3A is presented a flyback converter in which the dot end of the secondary winding is placed to the secondary ground, 14. The transformer itself remains the same, only the rectifier means is connected with its anode to the termination C of the secondary winding and the termination D of the secondary winding is connected to the secondary ground 14. The circuit configuration of the flyback converter presented in FIG. 3A is referred in the power conversion field as a "high side secondary rectifier".

The flyback converter presented in FIG. 3A works in the same way as the flyback converter presented in FIG. 1A. There is no difference in operation but there are some clear differences in the displacement currents though the parasitic capacitances in between primary winding 30 and secondary winding 32.

In the termination A, at the time when the primary switch closes the voltage will decay by ΔVA versus the primary ground 12. In the termination C of the secondary winding the voltage will decay by ΔVC versus the secondary ground 14. A displacement current I1, 38 will be created through the parasitic capacitance C1, 42. The value of the displacement current I1 is depicted by the equation 4 from FIG. 3B, $I1=k*Vin*((N-1)/N)$. In the case in which N=1, which means the number of turns in primary is equal to the number of turns in the secondary, the displacement current I1 is zero.

In termination B of the primary winding the voltage does not change versus primary ground. In termination D of the secondary winding the voltage does not change either versus secondary ground. In conclusion the displacement current In, through Cn, 46 is zero.

In the configuration presented in FIG. 3A, the displacement current through Cn is always zero and the displacement current through C1 is smaller than the displacement current from the configuration in FIG. 1. More than that in the event in which N=1 there is no displacement current because the terminations of the primary winding and secondary winding, swing with the same polarity. A quiet connection is a connection in which the voltage does not change when S closes or opens. Such a quiet connection is +HV, 90, GNDp,12, GNDs,14 and Vo,18. The termination B and D in FIG. 3A and termination B and C in FIG. 1A are placed to a quiet connection.

In the circuit presented in FIG. 3A the termination of the primary wining, A, and the termination of the secondary winding, C do move in the same direction versus the primary and respectively secondary ground when the switch S is closed and opened.

In conclusion the flyback converter configuration depicted in FIG. 3A is quieter in respect of noise injection from primary to secondary, via the parasitic capacitance between primary winding and secondary winding, than the configuration depicted in FIG. 1A. When ultrafast rectifiers or Schottky diodes were used for the rectifier means, 28, the utilization of the "the high side secondary rectifier" it was a relatively easy implementation. In the recent application in which synchronized rectification is used, the "high side secondary rectifier" becomes more challenging because the Mosfet used for synchronized rectifier has to be driven at the high side. In the case of synchronized rectification utilization of the output rectifier the implementation depicted in FIG. 1A is easy to implement because the gate of the mosfet which is used as synchronized rectifier is driven from the ground level.

Some of the embodiments herein make the use of a Mosfet as synchronized rectifier easy and the Mosfet will be driven from the ground level while still benefiting of zero displacement current as is achieved in FIG. 3A when N=1.

By analyzing the displacement current through the parasitic capacitances in the transformer Tr1, 52 in configuration from FIG. 1A and FIG. 3A it shows clearly that at high side secondary rectifier has lower displacement current thought the parasitic capacitance between primary and secondary winding. More than that for a transformer with a turns ration N=1 there is zero displacement current through the parasitic capacitances from primary to secondary winding of the transformer, which validates the main embodiment of the U.S. Pat. No. 5,107,411. The difference in EMI behavior between the high secondary rectifier and the low secondary rectifier is known by the experts in the field. This analysis was done in this patent in order to introduce an analysis methodology for underlining the key advantages of the main embodiments of this invention over the prior art.

The most traditional technique in preventing noise injection from the primary winding to the secondary winding of a transformer, technique used in switch mode power supply is the placement of a electrostatic shield formed by an incomplete turn of copper foil placed in between the primary winding and secondary winding. This electrostatic shield is usually connected to the input ground directly or via a ferrite bead or to the high voltage rail where the primary winding is connected in topologies such as flyback or single ended forward. In between the primary windings and also between secondary winding and the electrostatic shield there are parasitic capacitances which generate displacement currents during the operation. This specification generally refers to one application of the isolated transformer which is a flyback converter though the methodology described in this specification can be applied to any transformer and any topology. Further, for simplicity, the specification initially presents a simple non interleaved transformer structure having a primary winding and a secondary winding and in some cases some additional auxiliary windings. The embodiments of this specification are applied to any transformer structure, such as interleaved or multiple interleaved in which the primary and secondary windings are placed alternatively on the bobbin.

Figure 10A:
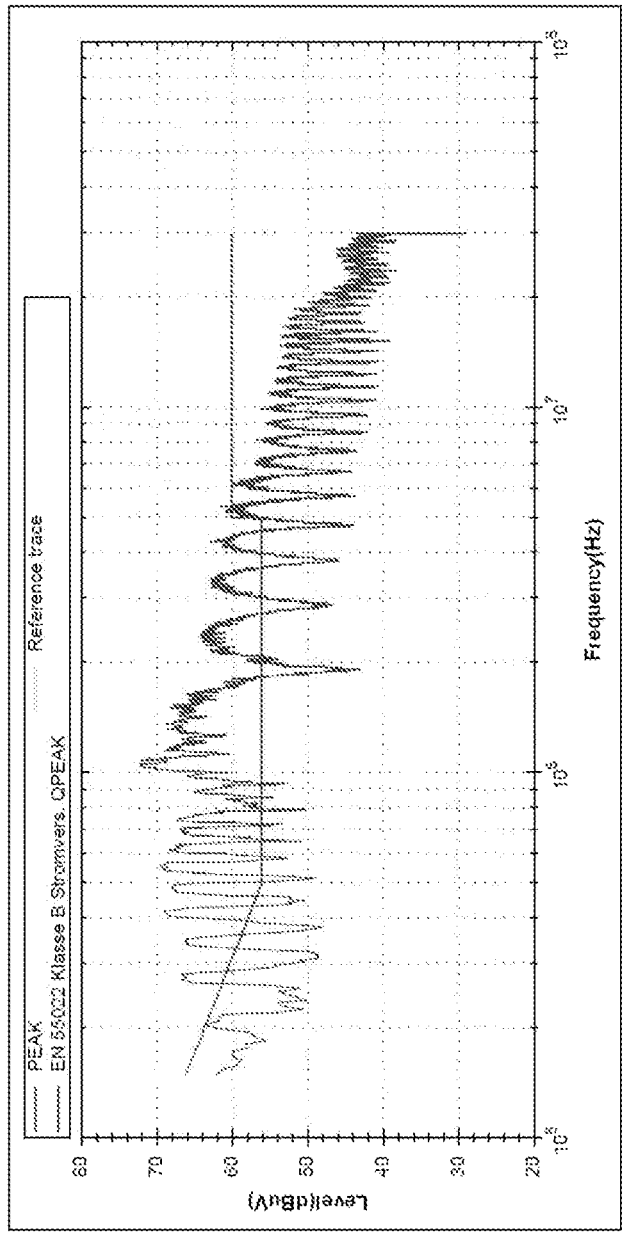
FIG. 10A presents EMI test results for a 30 W flyback converter using a transformer with no shield between the primary and secondary windings.
Figure 10B:
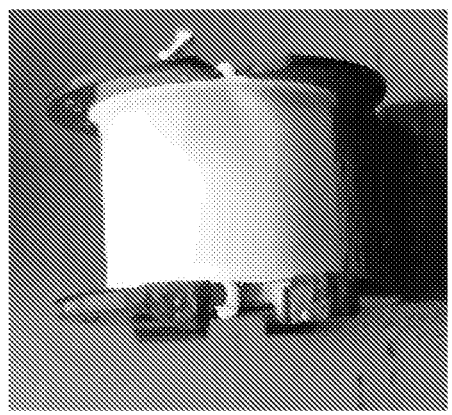
FIG. 10B depicts a bobbin of the transformer used in the EMI test presented in FIG. 10A just before the secondary winding is wound.

In FIG. 10A is presented the EMI test results of a 30 W flyback converter having a non-interleaved transformer using a RM8 type magnetic core and having an EMI filter designed to filter the differential and common mode noise. In FIG. 10B is presented the bobbin on which the primary winding is placed followed by an isolator and further the secondary winding will be placed. This experiment has 18 turns in primary and 4 turns in secondary. The test results are for Vin=230 Vac @ 50 hz for an output voltage of 12V @ 2.5 A and the plot from FIG. 10A is the QPEAK and the limits are based on the EN 55022 class B. It is visible than in some frequency ranges the violation of the limit is more than 15 dB.

Figure 11A:
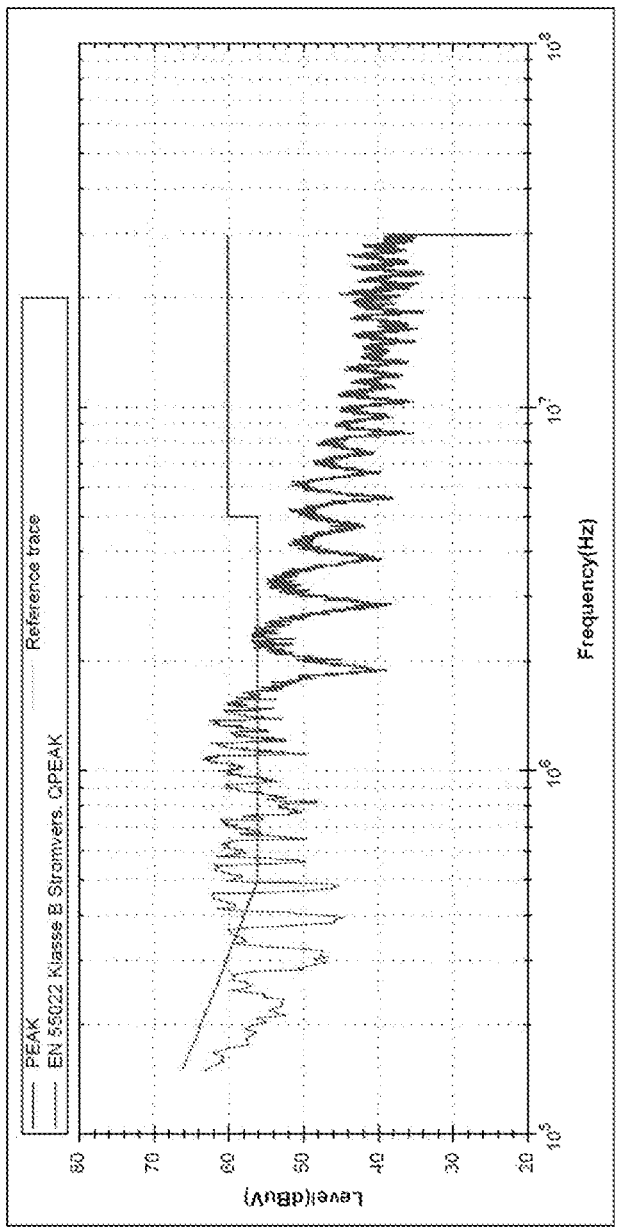
FIG. 11A depicts EMI test results for a 30 W flyback converter using a transformer with one conventional foil copper shield between the primary and secondary windings.
Figure 11B:
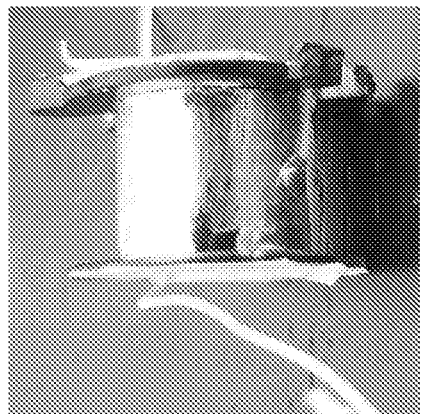
FIG. 11B depicts a bobbin of the transformer used in the EMI test presented in FIG. 11A just, after the copper foil shield is placed and before the secondary winding is wound.

In FIG. 11A is presented the EMI measurements results after one open turn copper shield is connected to primary ground is placed in between the primary and secondary, copper shield depicted in FIG. 11B. After the copper shield is placed the EMI level did decrease by 10 dB in some frequency ranges. The expectations were that the impact of the shield would have been more significant because the shield would prevent the displacement current through the parasitic capacitance between the primary and secondary winding. Analyzing the reasons why the traditional copper foil shield which is Prior Art is not as effective as expected it will lead us to the embodiments of this specification. The embodiments within the scope and spirit of this specification improve significantly the noise reduction of the shield.

There are several ways the noise generated by the voltage swing across the primary switch in a flyback converter and actually in any power converter, reaches the secondary. The voltage swing in the primary winding leads to displacements current into the secondary winding via the parasitic capacitances between primary and secondary winding. Another path of the noise injection from primary to secondary winding is via the core of the transformer. The primary winding will inject noise into the magnetic core via the parasitic capacitance between the primary winding and the core and further via the magnetic core this noise is injected into the secondary winding. To address that is common practice that in the power transformer a shield is placed in between the magnetic core and the primary winding. In most of the Prior Art the shield is made of a foil of copper which form an open turn in the transformer. In other Prior Art, the shield is formed by a wire wound layer of copper wire with one of the terminal not connected and another terminal connected to a primary ground or to DC input voltage, +HV, 90.

Another source of noise injection is caused by the secondary winding voltage swing, which generates displacement currents via the parasitic capacitance towards the copper shield and further into the primary ground or +HV, 90 where the shield is connected. Though the voltage swing in the secondary winding is not as big in amplitude as the voltage swing in the primary winding in many applications, this source of noise can be still high preventing the EMI test results to be within 6 dB under the EN 55022 class B limit, such is the case in this particular application mentioned in the specification. The embodiments presented in this specification will present solutions which will eliminate the noise injection from the secondary winding into the shield and further into the primary ground.

Figures 4A, 4B:
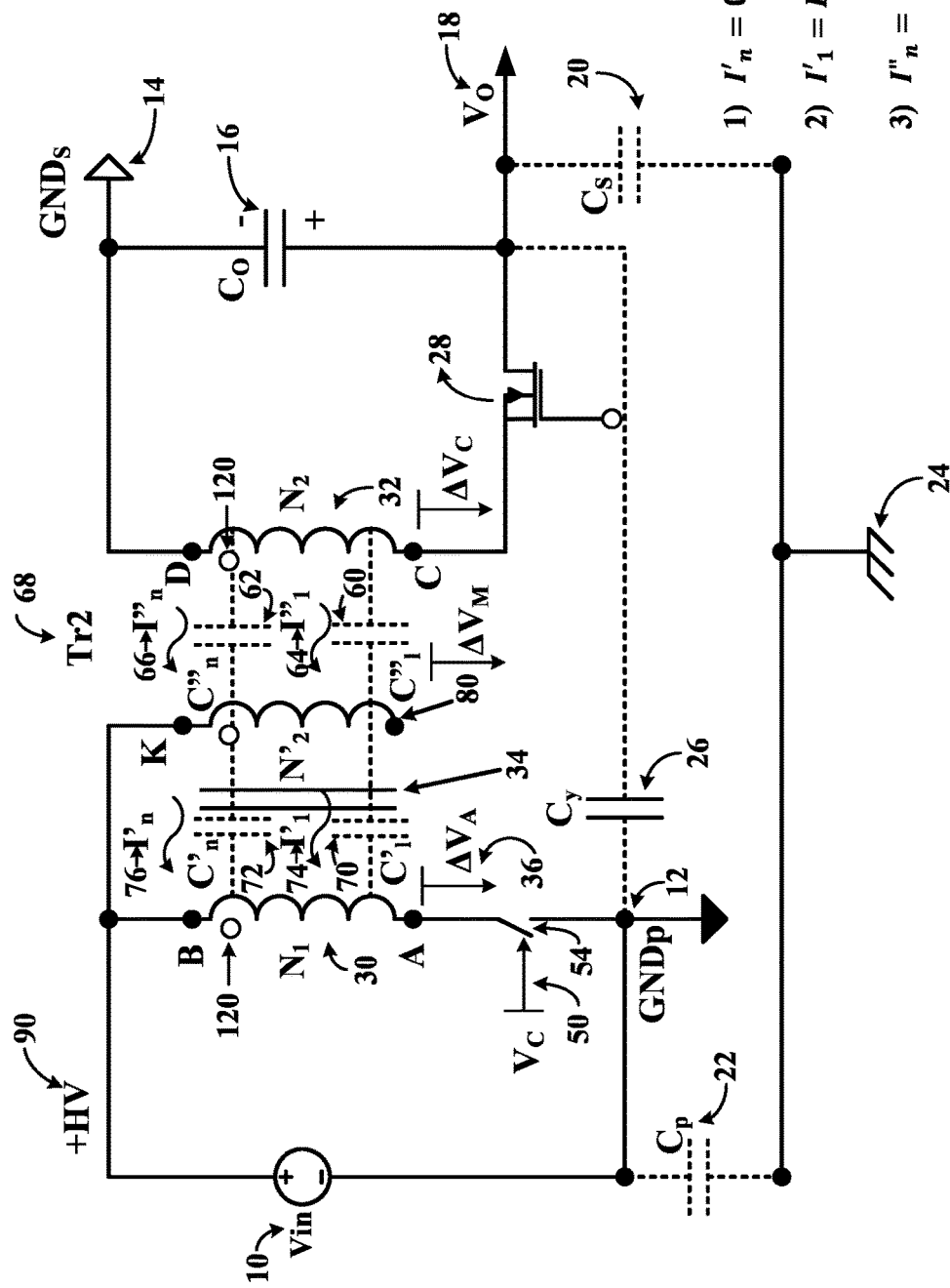
FIG. 4A depicts a power train of a flyback converter with a "high side secondary rectifier" and the active shield.
FIG. 4B depicts equations associated with the circuit from FIG. 4A.

In FIG. 4A is presented the flyback converter using a transformer Tr2, 68 with a primary winding 30 with two termination A and B, wherein A termination is connected to the primary switch, 54, and the B termination at the dot is connected to the Vin, 10, which is also labeled as +HV, 90. There is also a secondary winding with two terminations, a termination D at the dot, connected to secondary ground 14 and another termination, C connected at the anode of the rectifier means. In addition to these two main windings there is an active shield winding, 80 which has the number of turns N2' and wound in the same direction as the secondary winding. The active shield, 80, has two terminations, K and M. The K termination is placed to a quiet connection, +HV,90, and the M termination, of the active shield, 80, is not connected. The winding, 80, is referred in this specification as an active shield winding because acts as a shield and in the same time the active shield winding move with the same polarity and amplitude as the adjacent secondary winding preventing any displacement current to flow through the parasitic capacitances between secondary winding and the active shield winding. It can be built with exactly the same winding as the secondary winding or by using several stands of thinner wire in parallel to reduce its width and as a result reduce the leakage inductance between primary and secondary.

In between the active shield 80, and the primary winding, 30, there are parasitic capacitances. For simplicity, the specification defines just C1', 70, in between the primary winding located to the termination A, and the active shield winding, 80, located to the termination M, and C'n in between the primary winding located to the termination B, and the active shield winding, 80, located to the termination K.

In between the active shield 80, and the secondary winding, 32, there are parasitic capacitances. For simplicity, the specification defines just C1", 60, in between the secondary winding located to the termination C, and the active shield winding, 80, located to the termination M, and C"n in between the secondary winding located to the termination D, and the active shield winding, 80, located to the termination K.

When the primary switch 54, is closed the voltage in A terminal of the primary winding will start decreasing rapidly versus the input ground, 12. The voltage in the terminal B of the primary winding does not change. The voltage in K of the active shield winding does not change being connected to a quiet connection, which is the +HV. The voltage in M does change by $\Delta VM$ going lower versus the primary ground 12. A current will be produced through the parasitic capacitance between primary winding 30, and active shield winding, 80, displacement current which is proportionate by the difference in between $\Delta VA$ and $\Delta VM$. The displacement current though C1', 70 is presented in formula 2 from FIG. 4B. The displacement current through Cn' is zero because both ends of the parasitic capacitor Cn' do not swing being connected to a quiet connection, +HV,90. It is mentioned that I1' displacement current and I'n displacement current flow from the primary ground to the primary ground and is not part of the common mode noise. These displacement currents will impact the "effective capacitance" reflected across the primary switch S. In hard switching operation of the converter that will increase the switching losses, and in soft switching operation of the converter will require more energy to discharge the parasitic capacitance across the primary switch before the primary switch turns on. In the event N'2 is equal with N1, the I'1=0. In such a case, the effective capacitance reflected across the primary switch is reduced to the static parasitic capacitance across the main switch.

The static parasitic capacitance in the winding is the physical capacitance which is measured in a static mode when there is not AC voltage present across the windings. The effective capacitance is defined by the displacement current caused by the movement of the winding towards each other when ac voltages are present across the windings.

When the primary switch closes the voltage in termination D of the secondary winding 32 does not change being connected to the secondary ground 14. The voltage in terminal C of the secondary winding does swing lower reported to the secondary ground by $\Delta VC$. In equation 3 and 4 from FIG. 4B is concluded that displacement currents between secondary winding, 32 and the active shield, 80, via, C1",60 and Cn", 62 are zero if N'2=N2. That means that in the configuration depicted in FIG. 4A if the number of turns in the active shield has the same number of turns as the secondary winding, N2=N2', then the displacement current in between the active shield winding and the secondary winding is zero. In conclusion there is not displacement current between the secondary winding and the active shield winding. Because the active shield winding, 80 is connected to the input ground, there is not displacement current between secondary ground and the primary ground. The active shield winding has the role of an electrostatic shield and because the windings which form the active shield 80, move with the same polarity and the same amplitude as the secondary winding there is no common mode noise. For an ideal operation the secondary windings and the active shield winding shall be identical, which can be easily implemented in a multilayer PCB planar magnetic.

Figure 12A:
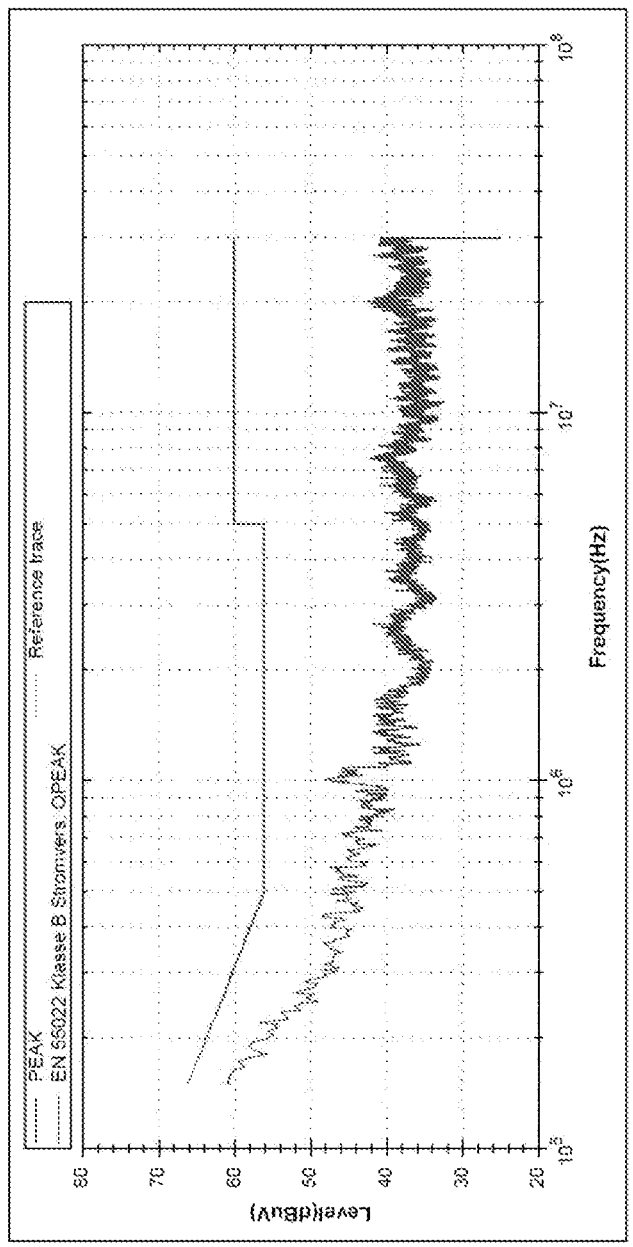
FIG. 12A depicts EMI test results for a 30 W flyback converter using a transformer with the active shield.
Figure 12B:
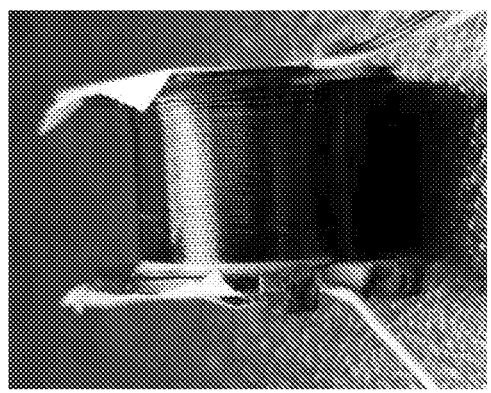
FIG. 12B depicts a bobbin of the transformer used in the EMI test presented in FIG. 12A, just after the active shield is placed and before the secondary winding is wound.

In wire wound transformers the active shield,80, shall be implemented by using multiple strands in parallel of thin wire with the same number of turns as the secondary winding. The thin wire used in multiple strands in parallel will decrease the distance in between the primary and secondary winding and in this way will decrease the leakage inductance between primary winding and secondary winding. The multiple strands of wire used for the active shield will cover the entire winding area in the bobbin covering fully the secondary winding. The use of thin wire in the active shield will also decrease the eddy current losses in the shield. In FIG. 12B is presented such an implementation of the active shield winding. A method of reducing common-mode noise in a switch mode power supply; the switch mode power supply having a primary side and a secondary side, a primary side ground and a secondary side ground, the primary side and the secondary side having a quiet termination wherein the voltage does not change versus the input ground and versus secondary ground during the operation of the switch mode power supply, and further having an input voltage source, at least one primary switch, a transformer and a power output; the transformer having at least a primary winding in the primary side, of the power supply and connected to the input voltage source via the primary switch, and at least one secondary winding of the transformer on the secondary side of the power supply, and the secondary winding connected to the power output via at least one rectifier means, at least one active shield winding placed in between the primary winding and the secondary winding having the same number of turns as the secondary winding and wounded in the same direction as the secondary winding, the active shield windings having two terminations and occupy the same axial position on the core as the secondary winding; and one termination of the active shield is connected to the primary quiet termination so that in operation all correspondingly adjacent the terminations of the secondary winding and the active shield winding carry alternating voltages of the same polarity and same amplitude.

In the configuration depicted in FIG. 4A zero displacement current between the parasitic capacitance between active shield and the secondary winding can be achieved. Because the active shield, 80, is connected to a quiet connection +HV, 90, further connected to the primary ground, zero common mode noise is flowing through the primary and the secondary ground.

FIG. 5A presents a flyback converter using the "low side output rectifier" configuration in which the secondary winding has the dot to the cathode of the rectifier means. The transformer Tr2, 68 from FIG. 5A has the same windings as the transformer presented in FIG. 4A. The difference is that the active shield winding, 80 is connected to the input ground, 12 at the terminal M. In the secondary the D terminal of the secondary winding 32 is connected to the cathode of the rectifier means and the C terminal of the secondary winding is connected to the Vo+, 18.

At the time when the primary switch S is closed the voltage in termination A of the primary winding start decreasing towards input ground, 12 by an amplitude $\Delta VA$. The voltage at the terminal M of the active shield winding, 80 does not move in reference to input ground. The current through the parasitic capacitance C1' is described by the equation 1 from FIG. 5B.

The current through the parasitic capacitance Cn' is described by the equation 2 of FIG. 5B.

The voltage in termination C of the secondary winding does not change when S is closed, and neither the voltage in termination M of the active shield winding. In the termination K of the active shield winding and the voltage in termination D of the secondary winding move with the same polarity and because N'=N2 and the current through Cn" is zero as described by the equation 4, for N'2=N2 from FIG. 5B.

Regardless of the configuration of the flyback converter, such is the "low side secondary rectifier" as depicted in FIG. 5A or the "high side secondary rectifier" configuration as depicted in FIG. 4A, the transformer Tr2, 68 using the active shield winding there is not common mode noise from the primary to the secondary of the transformer for N'2=N2.

In FIG. 5C is presented another structure with low side secondary rectifier but with the dot of the shield winding at the terminal M and the connection to the quiet spot is done at the terminal K and not in at the terminal M as is done in FIG. 5A. The currents through the parasitic capacitances C"1 and C"n are depicted in formula 1 and 2 from FIG. 5D. The displacement current In" is induced from the secondary into the primary ground via Cn" and the displacement current I1" is induced from the primary, via the active shield 80, into the secondary ground via C1". In formula 3 from FIG. 5D is depicted the common mode current which is the difference between I"n and I"1. In the event that N2'=N2 the common mode noise is zero. Unlike the embodiment presented in FIG. 5A in which the displacement current through the parasitic capacitances in between the active shield windings and the secondary windings is zero because the voltage on the active shield windings and the voltage on the secondary windings adjacent to each other move with the same polarity and the same amplitude, in the embodiment presented in FIG. 5C there is displacement current through the parasitic capacitances between active shield winding and the secondary winnings but the displacement current induced at each termination of the active shield winding and the secondary winding is of the same amplitude but of opposite polarity and they cancel and the common mode current from the primary ground to the secondary ground is zero.

This discloses a system and method of reducing common-mode noise in a switch mode power supply; the switch mode power supply having a primary side and a secondary side, a primary side ground and a secondary side ground, the primary side and the secondary side having a quiet termination in which the voltage does not change versus the input ground and versus secondary ground during the operation of the switch mode power supply, and further having an input voltage source, at least one primary switch, a transformer and a power output; the transformer having at least a primary winding in the primary side of the power supply and connected to the input voltage source via the primary switch, and at least one secondary winding of the transformer on the secondary side of the power supply, and the secondary winding connected to the power output via at least one rectifier means, at least one active shield winding placed in between the primary winding and the secondary winding having the same number of turns as the secondary winding and wounded in the same direction as the secondary winding, the active shield windings having two terminations and occupy the same axial position on the core as the secondary winding; and one termination of the active shield is connected to the primary quiet termination so that in operation all correspondingly adjacent the terminations of the secondary winding and the active shield winding carry alternating voltages of the opposite polarity and same amplitude.

The configurations from FIGS. 5A and 5C lead to the same results though the dot position in the active shield winding and the connection to the quiet connection are different. This configuration is another key embodiment of this invention.

This configuration is suitable in the event noise cancellation is necessary. Noise cancellation is a signal cancellation technique in which a signal is injected via the path between primary ground and secondary ground, signal injection which has the same amplitude but the opposite polarity of the common mode noise. This specification refers to the technique of signal cancellation as a noise cancellation. By tuning the number of turns in the active shield winding noise is injected in between primary to secondary ground via the parasitic capacitances between the active shield winding and the secondary winding, with a polarity controlled by the positive or negative sign of the flowing expression (N2−N2'). The amplitude of the noise injection is done by the difference between N2 value and N2' value.

If the number of turns in the active shield winding is different than the number of turns in the secondary winding, then the displacement current through the parasitic capacitance in between the active shield winding and the secondary winding is not zero, which means that common mode noise will be injected, common mode noise of a given polarity and a given amplitude function of the difference of turns between the active shield winding and the secondary winding. This displacement current can be utilized for the purpose of noise cancellation.

The common mode noise in between primary and secondary of a converter is transferred not only through the parasitic capacitance between the primary winding and secondary winding. As previously mentioned it can be transferred via the parasitic capacitance between the windings, primary and secondary winding and the magnetic core of the transformer. There are also other path of common mode noise transferred, via layout, and coupling between the converter components. In such cases having zero displacement current via the parasitic capacitance between secondary and primary winding or via the secondary and active shield winding does not eliminate the common mode noise entirely.

Figure 16A:
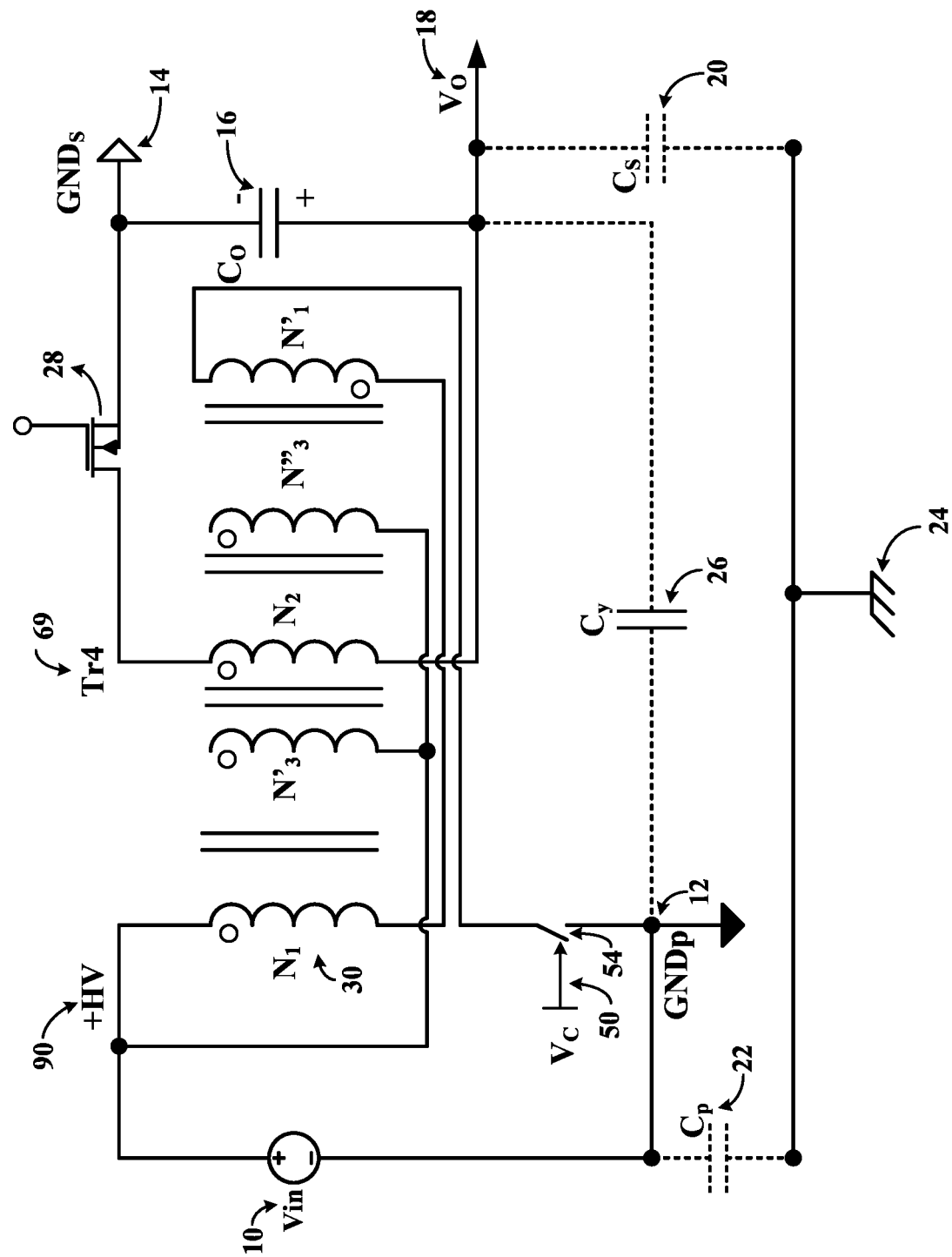
FIG. 16A presents an interleaved magnetic structure using two active shield winding and split primary winding configuration.
Figure 16B:
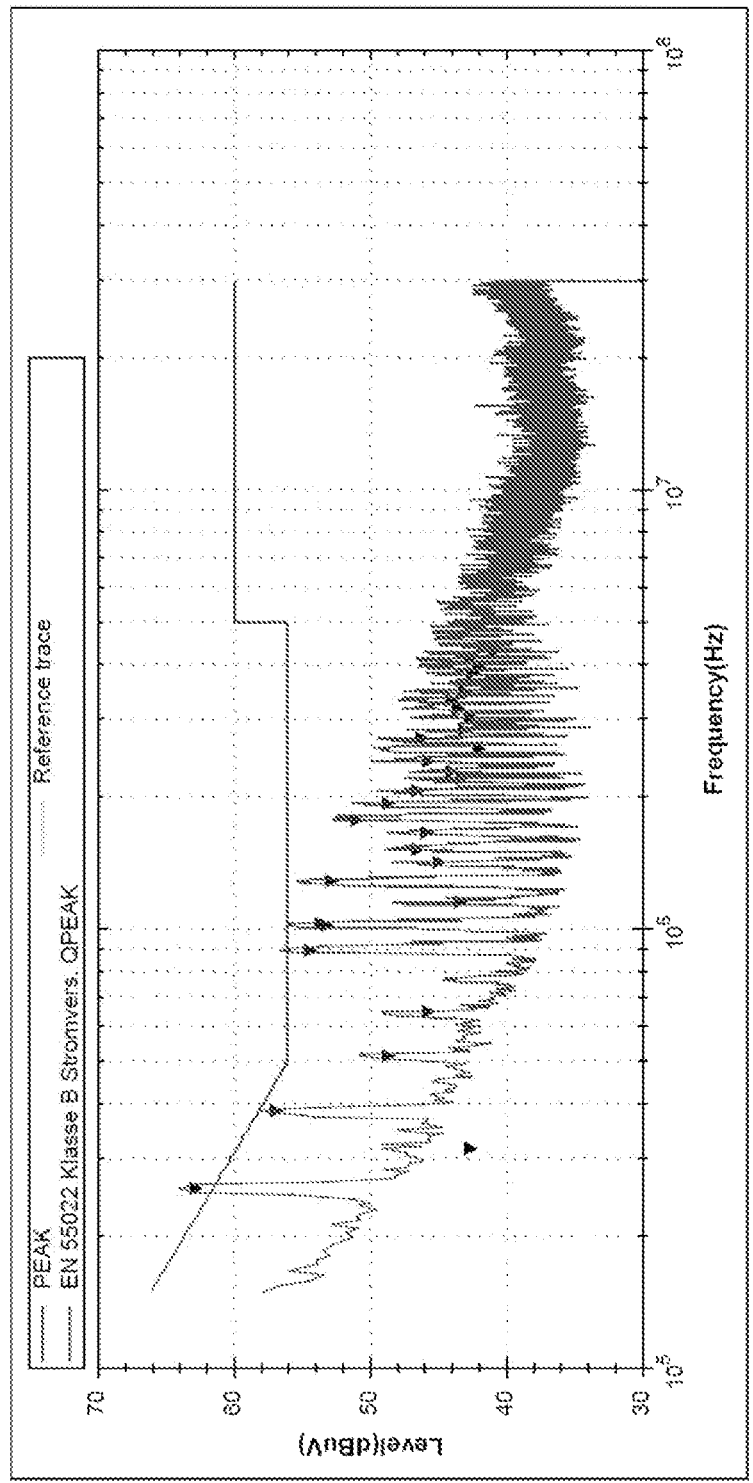
FIG. 16B presents EMI test results of a flyback converter using a flyback transformer as in FIG. 16A.

In such cases allowing a controlled displacement current of the right amplitude and polarity through the parasitic capacitance between active shield winding and secondary winding can reduce significantly to common mode noise. In FIG. 16A is depicted a transformer, having interleaved primary and secondary winding and two active shield windings, N3' and N3". The primary winding is placed first on the bobbin, half of primary forms the first layer, N1, and the other half of primary forms the last layer, N1'. In between the primary windings formed by N1 and N1' there are placed the active shields N3' and N3" and the secondary winding N2, is placed in between the two active shields, N3' and N3". The configuration from FIG. 16A is using the embodiment of FIG. 5A, in which the active shields windings have the same number of turns as secondary winding and the voltages on the windings terminations move with the same amplitude and with the same polarity. For the configuration in which N1=N1'=11 turns, N3'=N3"=4 turns and N2=4 turns, and using a very small Y cap of 68 pF, the EMI measurements are depicted in FIG. 16B. As is visible from FIG. 16B the common mode noise exceeds the EN55022 Klasse B, QPEAK limits at several frequencies. Though the displacement current via the parasitic capacitance between the active shield windings and the secondary winding is zero, the common mode noise is not zero, due to noise penetration via the parasitic capacitance between windings and the magnetic core and other means as previously presented. In such cases the solution presented in this specification is to control the noise injection in the transformer via the parasitic capacitance between the active shield winding and the secondary winding by tuning the number of turns in the active shields.

Figure 16C:
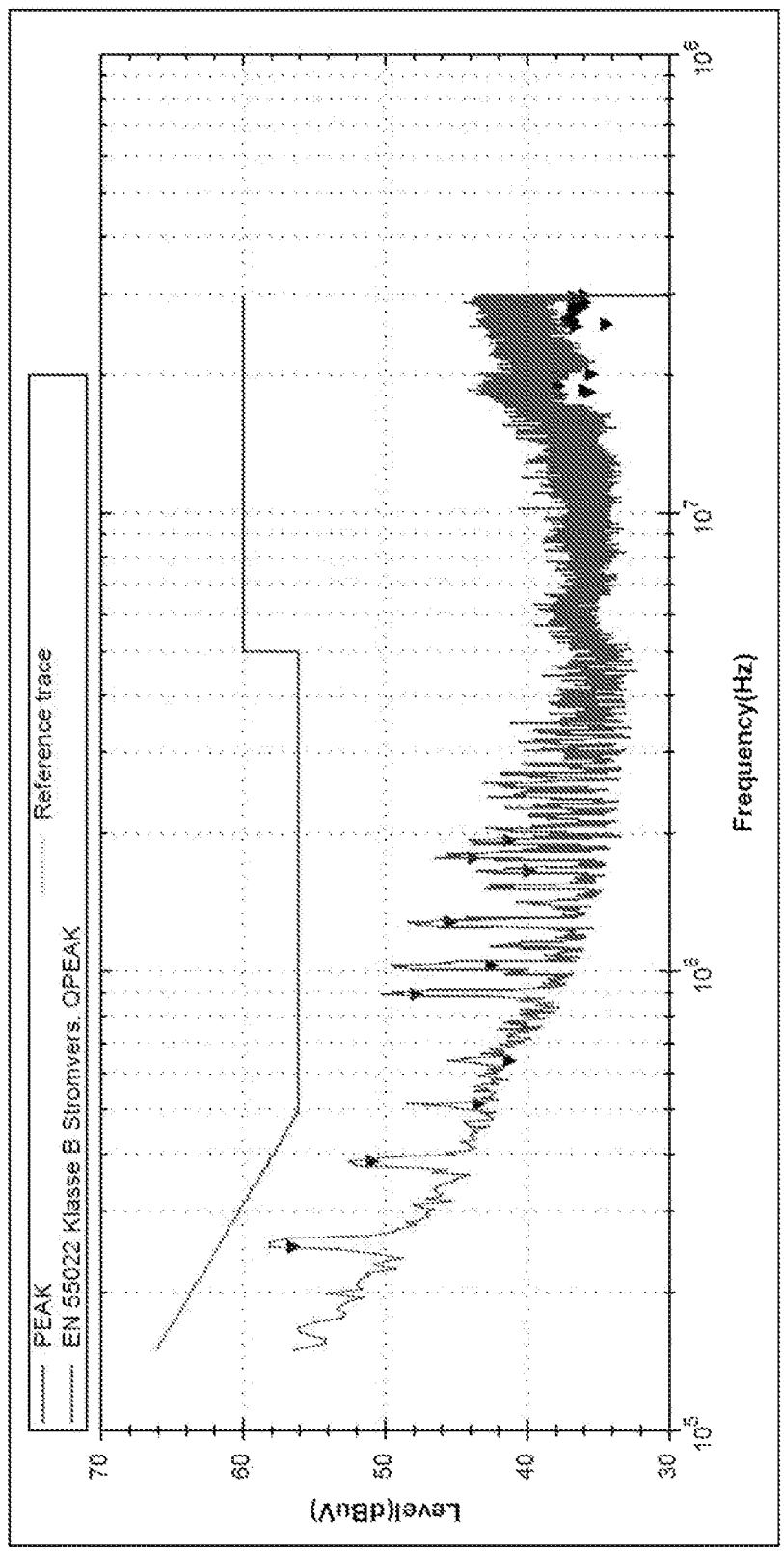
FIG. 16C presents EMI test results of a flyback converter using a flyback transformer as in FIG. 16A and with N3' is seven turns.

In FIG. 16C are presented the EMI measurement results for the configuration from FIG. 16A for the configuration in which N1=N1'=11 turns, N3'=7 turns, N3"=4 turns and N2=4 turns. It is visible by comparing the measurement from FIG. 16C and FIG. 16B, that by using the controlled noise injection between active shield winding and the secondary winding, there is an attenuation of 8 dB and in this mode bring the EMI into compliance level.

Another embodiment combines the active shield from the embodiment presented in FIG. 5A with the active shield embodiment presented in FIG. 5C. Such implementation is depicted in FIG. 17A.

Figure 17A:
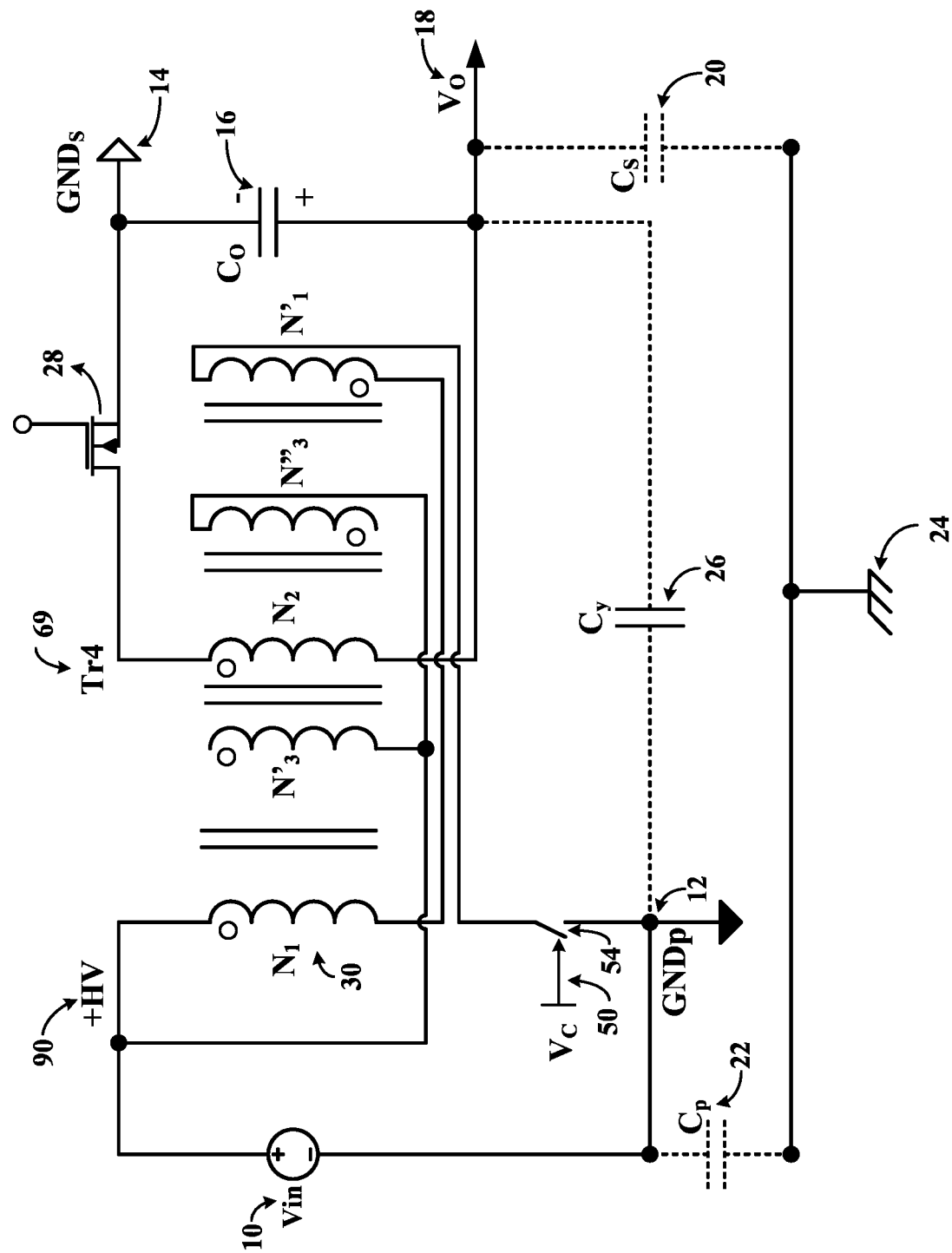
FIG. 17A presents an interleaved magnetic structure using two interleaved shield winding wherein the second active shields connected.
Figure 17B:
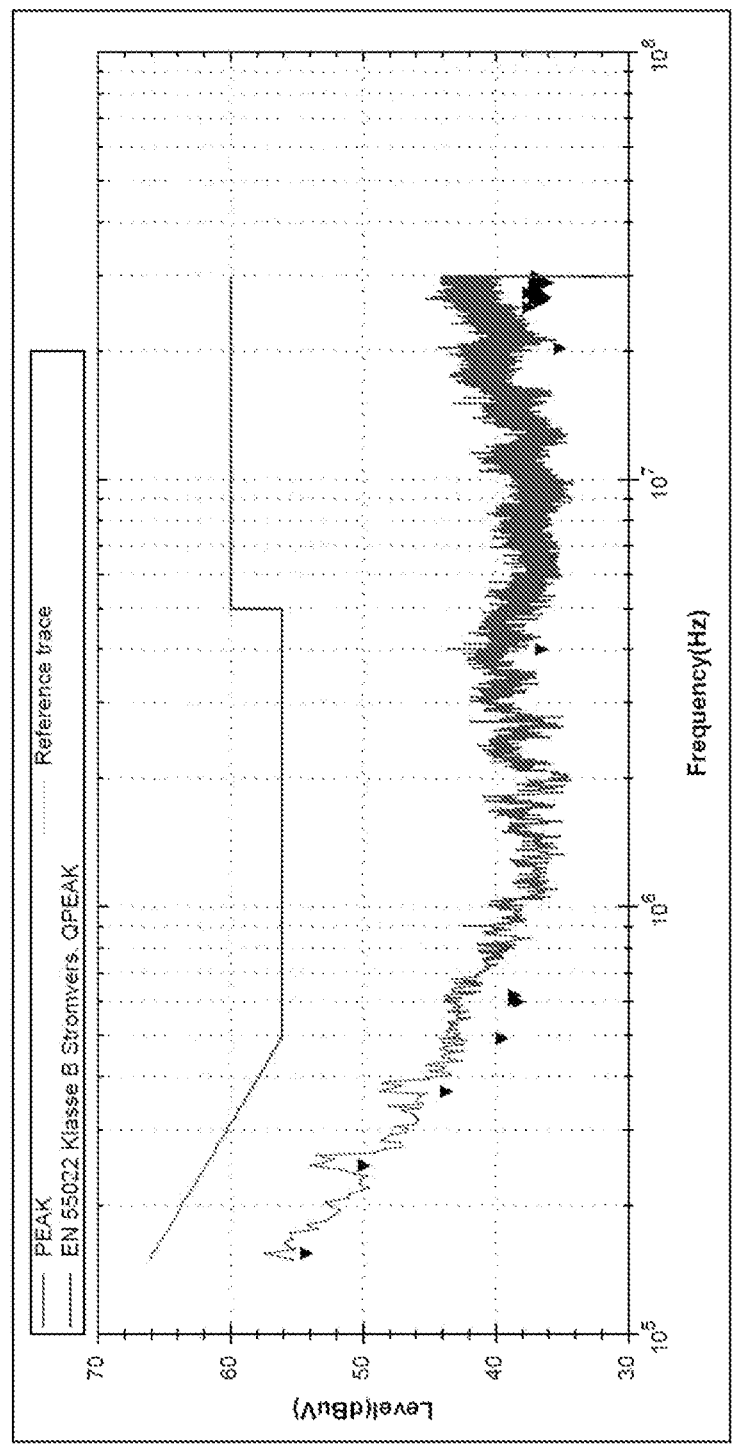
FIG. 17B presents EMI test results of a flyback converter using a flyback transformer as in FIG. 17A and with N3' is six turns and N3" is seven turns.

In FIG. 17A the active shield, N3' is in compliance with the configuration depicted in FIG. 5A and the shield, N"3 is in compliance with the configuration depicted in FIG. 5C. The EMI test results from the configuration from FIG. 17A, wherein N1=N1'=11 turns, N3'=6 turns, N3"=7 turns and N2=4 turns is presented in FIG. 17B. In this configuration the attenuation is 14 dB in comparison with the test results from configuration from FIG. 16A with the test results from FIG. 16B. The test results from the configuration from FIG. 17A which are presented in FIG. 17B, is passing the EN 55022, Klasse B QPEAK with 8 dB of margin and using a Y capacitor of 68 pF.

This discloses a system and method of reducing common-mode noise in a switch mode power supply; the switch mode power supply having a primary side and a secondary side, a primary side ground and a secondary side ground, the primary side and the secondary side having a quiet termination in which the voltage does not change versus the input ground and versus secondary ground during the operation of the switch mode power supply, and further having an input voltage source, at least one primary switch, a transformer and a power output; the transformer having at least a primary winding in the primary side and connected to the input voltage source via the primary switch of the power supply, and at least one secondary winding of the transformer on the secondary side of the power supply, in which the secondary winding connected to the power output via at least one rectifier means, at least two active shields winding adjacent to the secondary winding on both sides of the secondary winding having the same number of turns as the secondary winding and wounded in the same direction as the secondary winding, and occupy the same axial position on the core as the secondary winding; and one termination of each active shield is connected to the primary quiet termination so that in operation all correspondingly adjacent the terminations of the secondary winding and the active shield windings carry alternating voltages of the same polarity and same amplitude.

As mentioned before the noise injection in the secondary winding does not always come from the primary winding via the parasitic capacitance between the primary winding and the secondary winding. The embodiments using an active shield winding do prevent only this type of noise injection.

Figure 6A:
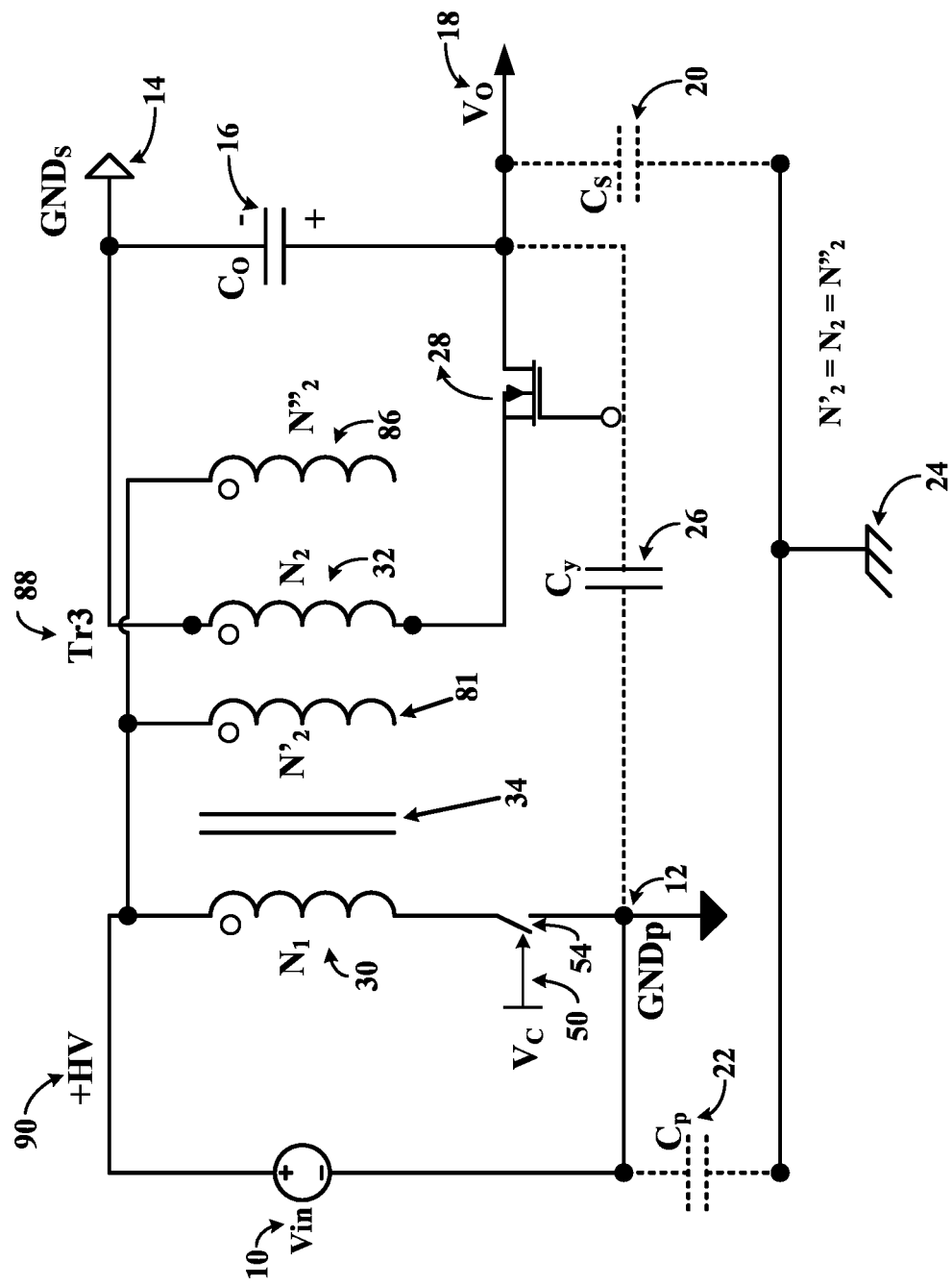
FIG. 6A depicts a power train of a flyback converter with a "high side secondary rectifier" and a dual active shield.
Figure 6B:
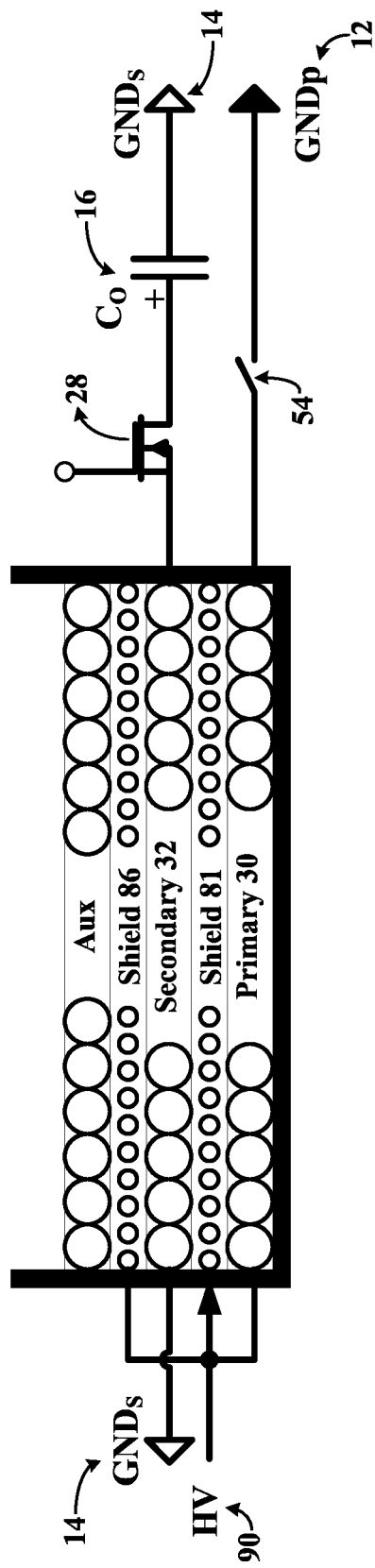
FIG. 6B depicts a winding arrangement in a transformer bobbin.

In addition to that, noise can be injected into the secondary winding from the auxiliary windings when the auxiliary windings are placed near the secondary winding. In FIG. 6A and FIG. 6B is presented another embodiment in which an active shield winding is placed between the primary winding and the secondary winding and another active shield winding is placed on top of the secondary winding to prevent noise injection from the core or from the auxiliary windings. This embodiment is presented in FIG. 6A and the construction technique is depicted in FIG. 6B. In FIG. 6B on the first layer is placed the primary winding. On the second layer is placed the active shield winding in this drawing implemented by multi-strands of thin wire, the active shield winding having the same number of turns as the secondary winding. On the third layer is placed the secondary winding, on the fourth layer is placed the active shield winding and on the top layer is placed the auxiliary winding or no other winding function of the application. The purpose of this configuration is to shield the secondary windings not only from the noise generated by the primary windings but also form noise generated from the auxiliary windings.

In additions to the noise injection methodologies based on tuning the numbers of turns in the active shield versus the number of turns in the secondary windings, another embodiment uses even fractional turns in the active shields to adjust the noise suppression signal.

Figure 7A:
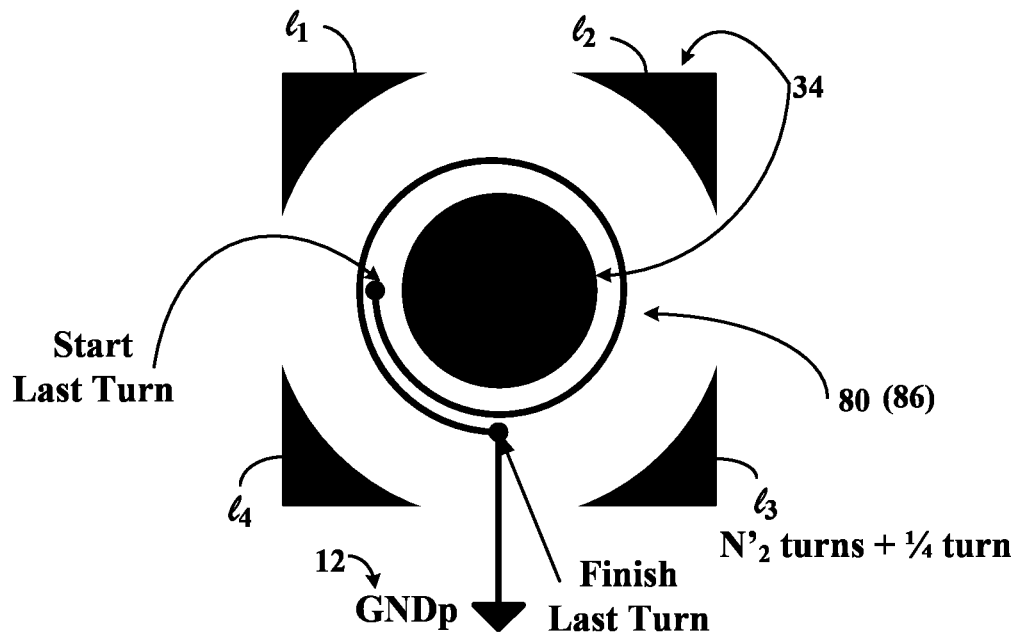
FIG. 7A presents a noise cancellation technique by adding fractional turns.
Figure 7B:
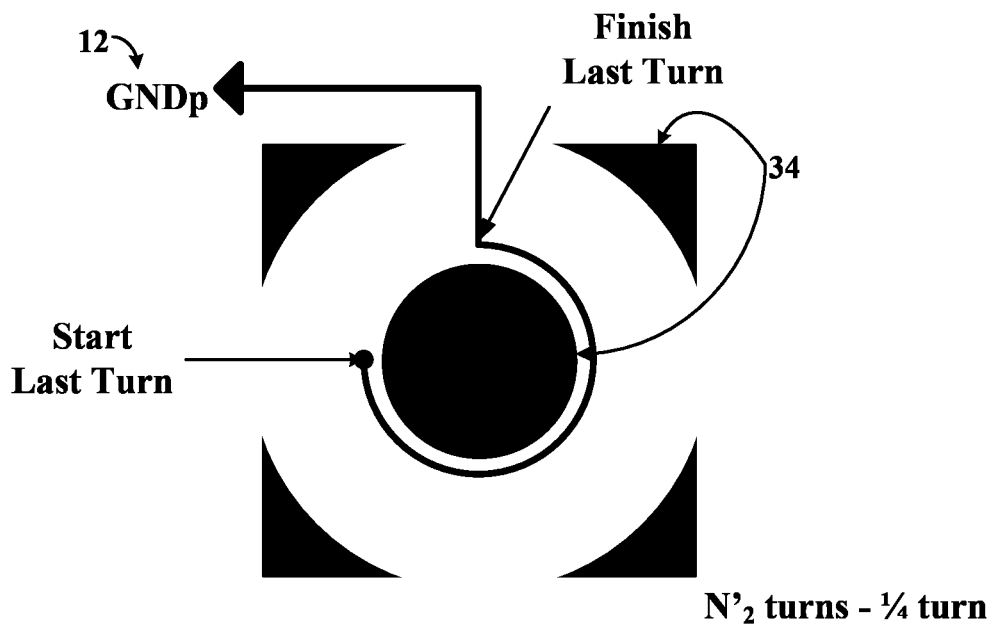
FIG. 7B presents a noise cancellation technique by subtracting fractional turns.

In FIGS. 7A and 7B is presented another embodiment in which the number of turns in the active shield winding varies slightly versus the number of turns in the secondary winding by using a different number of turns or even fractional turns to adjust the noise suppression signals.

In FIGS. 7A and 7B the magnetic core, 34, has one central post, CP, and four outer legs, 11, 12, 13 and 14. That allows the use of fractional turns starting with quarter turn, ¼, and also half turn, ½.

For example for 1 turn secondary in FIG. 7A, the number of turns in the active shield is modified to be 1.25 turns and in FIG. 7B is modified to be 0.75 turns.

Figure 13:
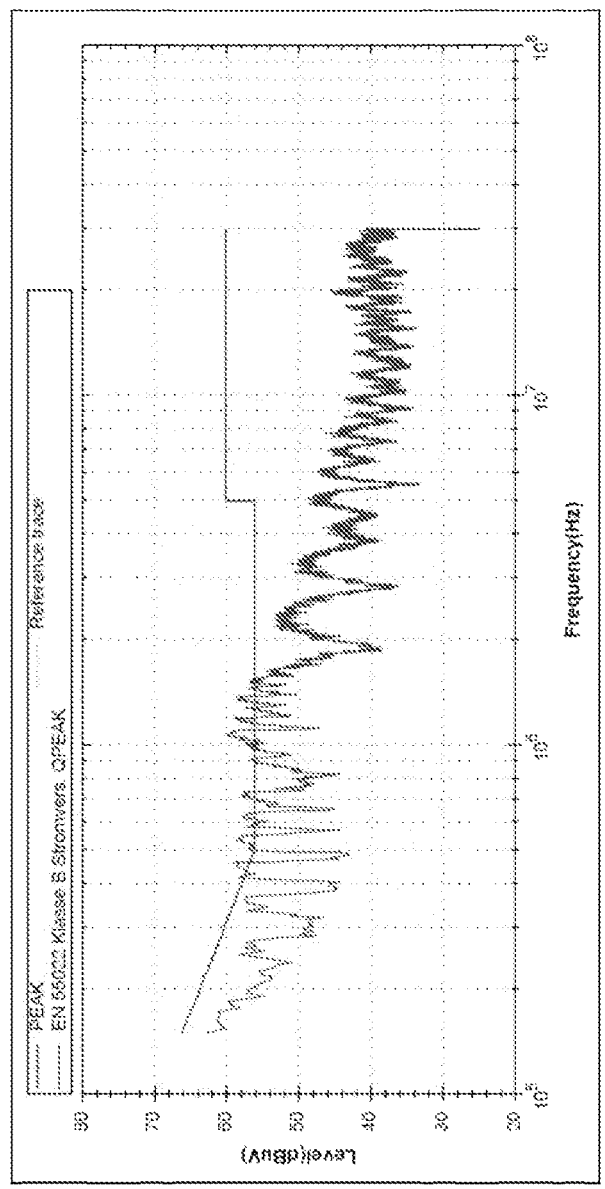
FIG. 13 depicts EMI test results for a 30 W flyback converter using a transformer with an active shield, wherein the number of turns in the shield is three turns instead of four as the secondary winding.
Figure 14:
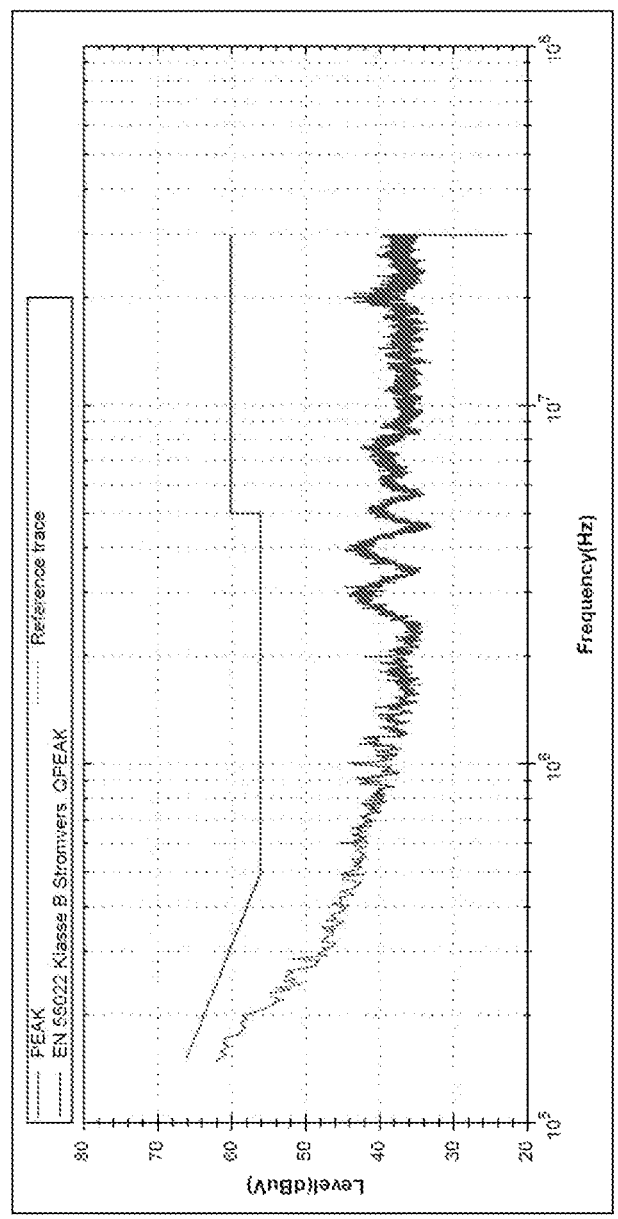
FIG. 14 depicts EMI test results for a 30 W flyback converter using a transformer with the active shield, wherein the number of turns in the shield is five turns instead of four turns as the secondary winding.

Because there is not power delivered via the active shield winding the fractional turns can work without the risk of magnetic flux unbalance. In some cases even a larger increment can be used, such as full turns, rather than fractional turns. For example for a 4 turns secondary, the number of turns in the active shield can be 3 or 5 turns function of the polarity of the additional noise injected. In FIG. 13 shows the EMI if only 3 turns is used for the active shield and in FIG. 14 if 5 turns are used in the active shield rather than 4 turns as is depicted in FIG. 12A. In FIG. 12A when 4 turns are used for the active shield, the same numbers as the secondary winding, there is a larger amplitude noise around 1 Mhz caused by the ringing across the main switch during the dead time of the flyback converter. That noise could have been injected through other means rather than the parasite capacitance between primary winding and secondary wining, such as through the magnetic core. By placing 5 turns in the active shield rather than 4 turns a signal of opposite polarity of the common mode noise was injected from the active shield to the secondary winding via the parasitic capacitance in between the active shield and secondary winding and that signal did cancel the 1 MHz noise as can be seen in FIG. 14.

This discloses a system and method for which the number of turns for the active shields windings is adjusted in order to create a mismatch to the secondary winding and induce a voltage into the secondary winding designed to be of opposite polarity of the residual common mode noise injected from primary to secondary.

In noise cancellation technique in which the number of turns in the shield is tuned to be higher or smaller than the number of turns in the secondary winding the noise injection from the primary winding to the secondary winding can be also tuned by partially removing wire wound active shield allowing the noise from the primary to reach the secondary.

Figure 8:
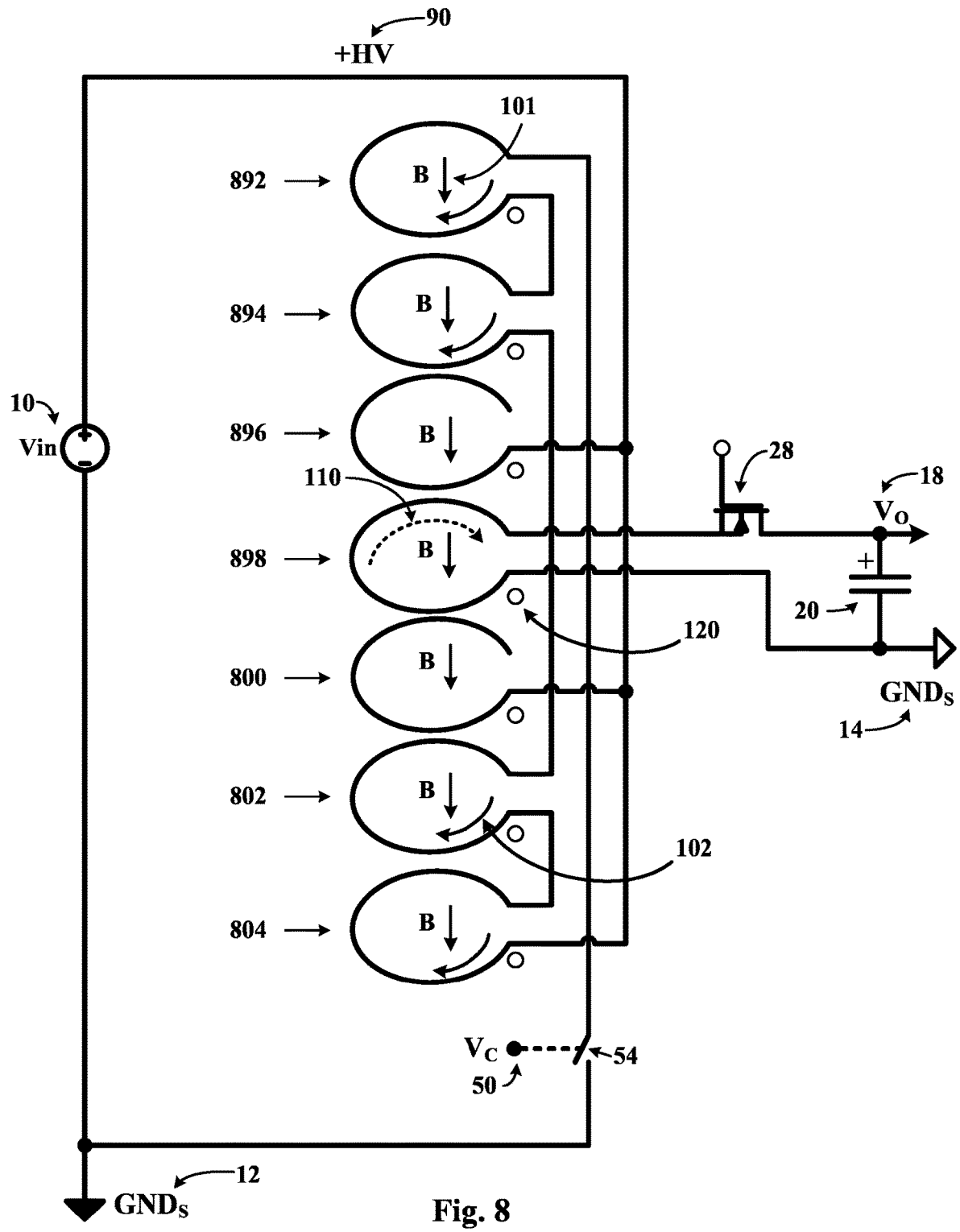
FIG. 8 presents an embodiment applied to a planar transformer.

The embodiments herein can be also used in planar transformers. FIG. 8 presents the power train of a flyback converter for which the transformer winding is embedded in a multilayer PCB. Primary windings are placed on four layers 892, 894, 802 and 804. The number of turns per layer may vary function of the application. The secondary windings are placed on the layer 898. The active shield windings are placed on the layer 896 and 800, and have to have the same number of turns as the secondary or can have a slight different number of turns including fractional turns as described by the embodiment from FIGS. 7A and 7B if noise cancellation technique is employed. The secondary winding placed on the layer 898 may be placed on several layers, usually an even number. In the event the secondary winding is placed on several layers, the number of turns and the dot (120) for the active shield on layer 896 and 800 shall be the same as the secondary layers adjacent to the shield to comply with the active shield solution from FIG. 4A.

The displacement current between the active shield and the secondary winnings adjacent to it shall be zero.

Further, in embodiments, the transformer is implemented in a multilayer PCB and the windings on the layers adjacent to the secondary windings, on both side of the secondary winding, are the mirror imagine of the secondary winding and they carry alternating voltages of the same polarity and same amplitude as the secondary winding.

In applications in which controlled noise injection is utilized the number of turns in the active shields may be different than the number of turns in the secondary.

In the event the embodiment depicted in FIG. 5C is employed, the connection to the quiet termination and the dot position for the active shield shall be in compliance with the concept depicted in FIG. 5C.

Figure 9A:
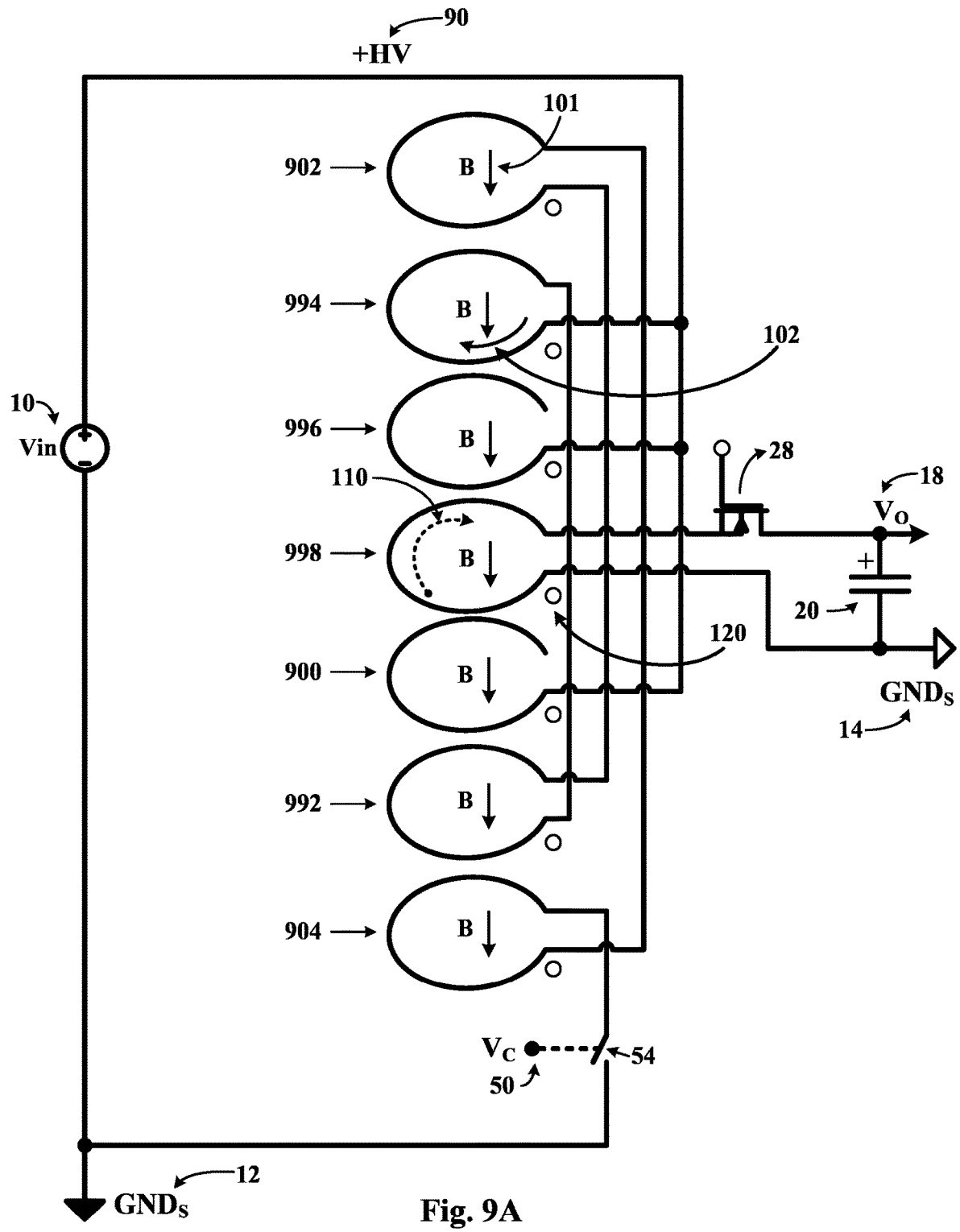
FIG. 9A presents an embodiment in which the displacement current between the active shield and the primary winding is minimized.

FIG. 9A presents another embodiment in which the active shields, on layer 900 and 996 are adjacent to the secondary windings on layer 998, and the active shields are connected to the quiet end of the primary at +HV, 90. For example if the number of turns of the primary winding per layer 992 and 994 is just one, and the active shield windings placed on layer 996 and 900, is also one, the displacement current via the parasitic capacitance between layer 992 and layer 900 and respectively from layer 994 to 996, is low because the primary windings placed on layer 994 and 992 have a lower voltage swing being connected closer to +HV. In addition to that the displacement current between primary windings from layers 992 and 994 and the active shield winding placed on layer 996 and 900 is in between primary ground to primary ground and it does not influence the common mode noise. This displacement current will just influence the switching losses and impact the efficiency of the power converter.

Figure 9B:
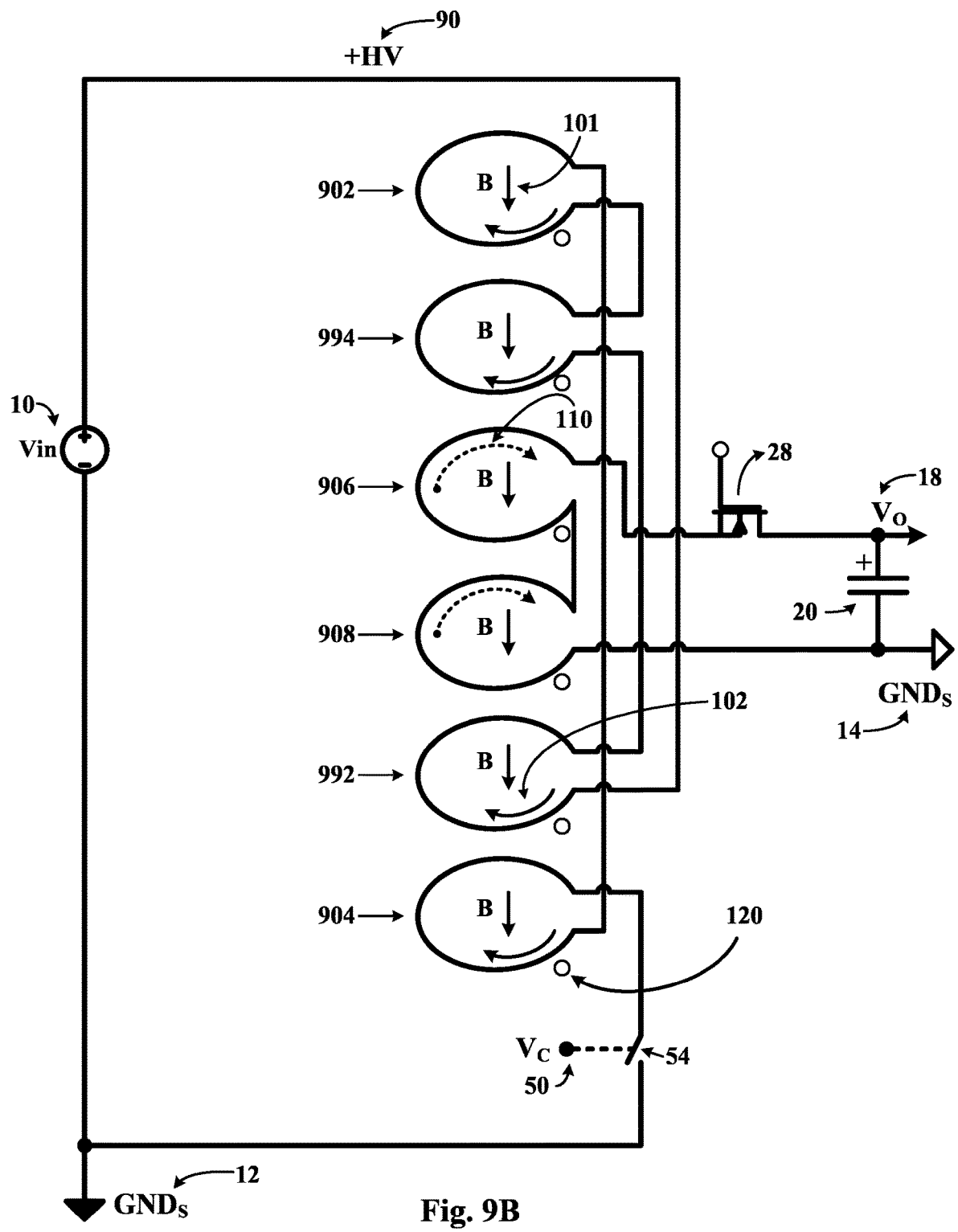
FIG. 9B presents an embodiment in which the primary winding incorporated in two layers of a PCB is a total mirror of the secondary winding adjacent to the primary winding and there is no displacement current between primary and secondary winding.

In FIG. 9B is presented another embodiment. The secondary windings are placed on at least two layers, in this case layer 906 and 908. In one particular implementation let's consider that the number of turns in secondary is two, one turn per layer 906 and one turn per layer 908 and these windings are in series, in total two turns. The number of turn's per layer 992 of the primary winding is one as well and the number of turns of the primary winding placed on layer 994 is one turn as well. In cases in which the total number of turns in the primary is 12, there will be 5 turns placed on the layer 902 and 5 turns on the layer 904. For practical purposes more layers can be added for the primary winding with the goal of decreasing the number of turns per layer for layer 902 and layer 904. The primary winding on the layer 992 and on the layer 994 in this implementation will have two roles. One role is to be part of the primary winding and the second role to be the active shield winding for the secondary windings placed on layer 906 and 908. This would be the same implementation as in FIG. 4A with the difference that the active shield winding is also part of the primary winding. This makes the active shield winding part of the power train, wherein power is transferred through these winding and also these windings are used as active shields. The embodiment of FIG. 9B eliminates the need for two additional layers wherein to place the active shield winding. In this example, one turn per layer in the layers 992, 994, 906 and 908 is used. This embodiment works for any number of turns per layer as long as the number of turns per layer in 906 and 994 and respectively per 908 and 992 is the same.

Moreover, the windings on the layers adjacent to the secondary windings, are part of the primary windings.

In FIGS. 8, 9A, 9B and 9C is depicted also the magnetic flux B, produced by the current through the primary winding, 101, The arrow line, 102, represents the current flowing through the primary winding. The dotted line per layer 906 and 908, labeled 110, represent the current flow in the secondary winding after the switch, 54, turns off. This applies only for the flyback topology. The embodiments apply also for any topology such as forward derived topologies.

Figure 9C:
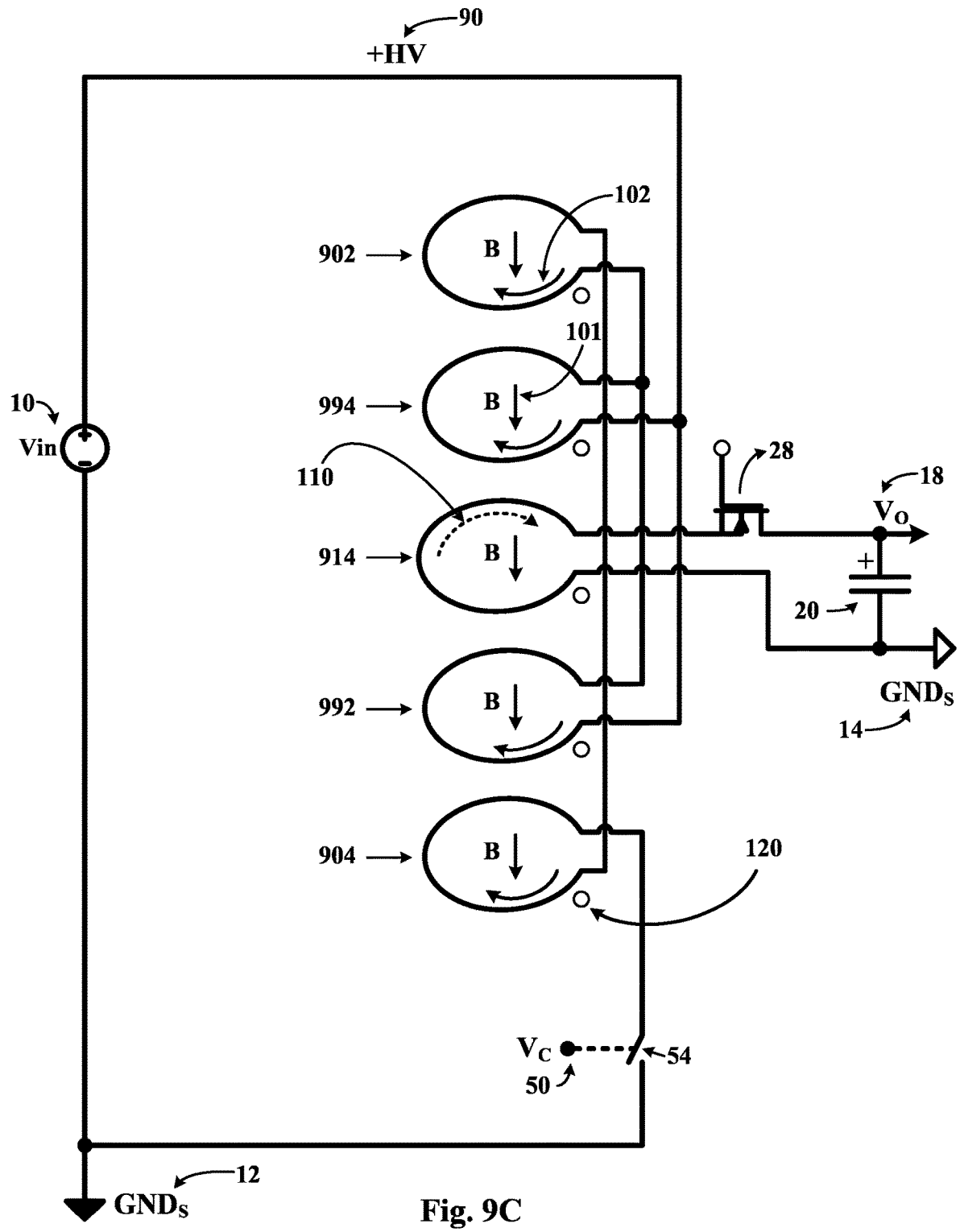
FIG. 9C presents an embodiment in which the primary winding also has the role of an active shield.

In FIG. 9C is presented another embodiment in which the secondary winding is placed layer 914, on one or several layers. In this case the primary winding adjacent to the secondary winding placed on layer 992 and layer 994 are in parallel unlike the structure depicted in FIG. 9B in which the primary winding 992, and 994 which act as active shield are placed in series. The primary windings 992 and 994 and have the same number of turns as the secondary windings and are placed on the adjacent layers to the secondary windings 914. Like in FIG. 9B the primary winding on layer 994 and layer 992 takes the role of the active shield. This is done by having the primary winding adjacent to the secondary winding to have the same number of turns as the secondary winding and the voltage swing is in such way that the displacement current through the parasitic capacitance between 994 and 914 and 992 and 914 is zero. In additional to that the primary winding which takes the role of the active shield are also connected to the quiet termination. The winding 992 is connected to HV+ and the winding 994 is connected to +HV as well. The embodiment described in FIGS. 9B and 9C is suitable for multilayer planar transformer because additional layers are not needed just for the active shield windings. For example in FIG. 9B 4 layers are allocated for the primary winding and two layers for the secondary winding, in total only 6 layers instead of eight layers if the embodiment described in FIG. 8 and FIG. 9A would be used.

The embodiments within the spirit and scope of this specification are applicable also in the more complex magnetic structures as the one presented in U.S. Application Publication No. US 2016/0307695 entitled "Magnetic Structures for Low Leakage Inductance and Very High Efficiency."

Figure 15A:
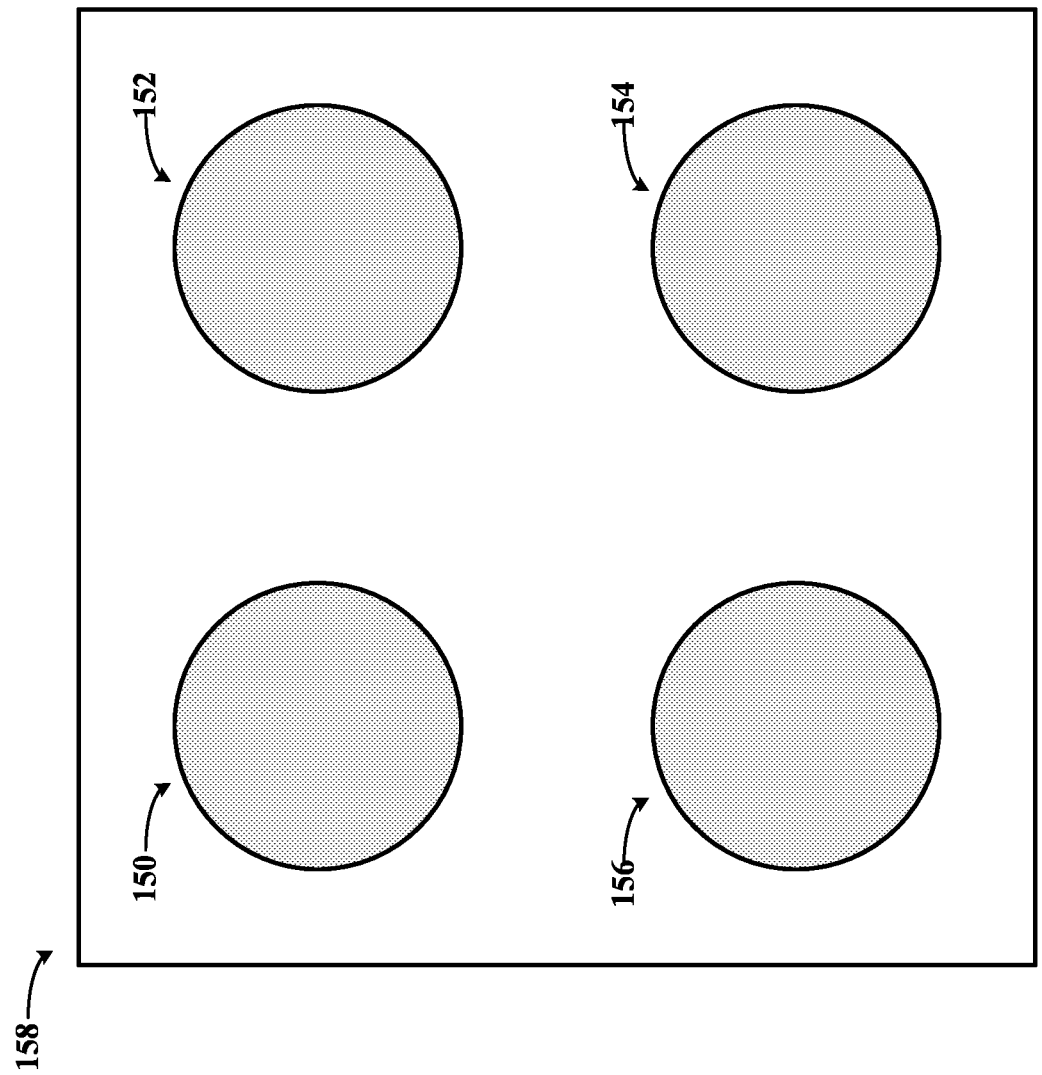
FIG. 15A depicts a magnetic core structure using four identical posts.
Figure 15B:
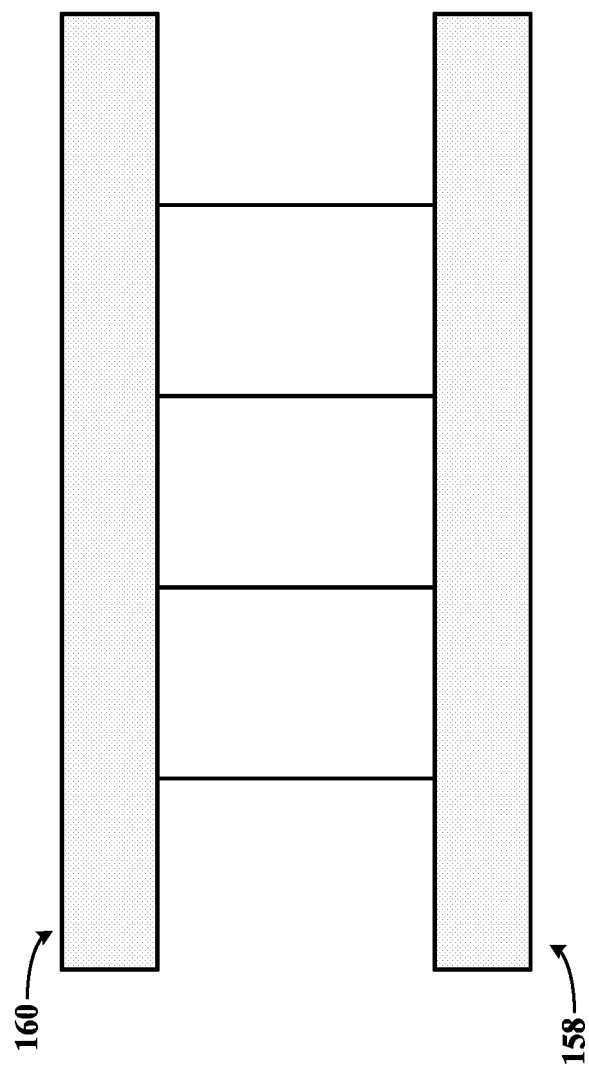
FIG. 15B presents a vertical cross-section of the magnetic structure of FIG. 15A.

In FIG. 15A is presented a horizontal cross-section through a multi-leg magnetic structure presented in the "Magnetic Structures for Low Leakage Inductance and Very High Efficiency" patent application. The magnetic structure depicted in FIG. 15A contains has four legs, 150,152,154 and 156 and two plates 158 and 160, as is depicted also in the vertical cross-section of this magnetic structure in FIG. 15B. The primary winding is wound around the four legs as depicted in FIG. 15D. The magnetic field through each leg has an opposite polarity to the legs adjacent to it. This magnetic structure is suitable for flyback transformer and also for forward derived transformer. The leakage inductance between primary winding and secondary winding becomes very small which makes this transformer structure suitable for flyback applications. In addition to that the number of layers in such structures can be reduced and the volume of the magnetic core is smaller than for independent transformers which will reduce the core loss.

Figure 15C:
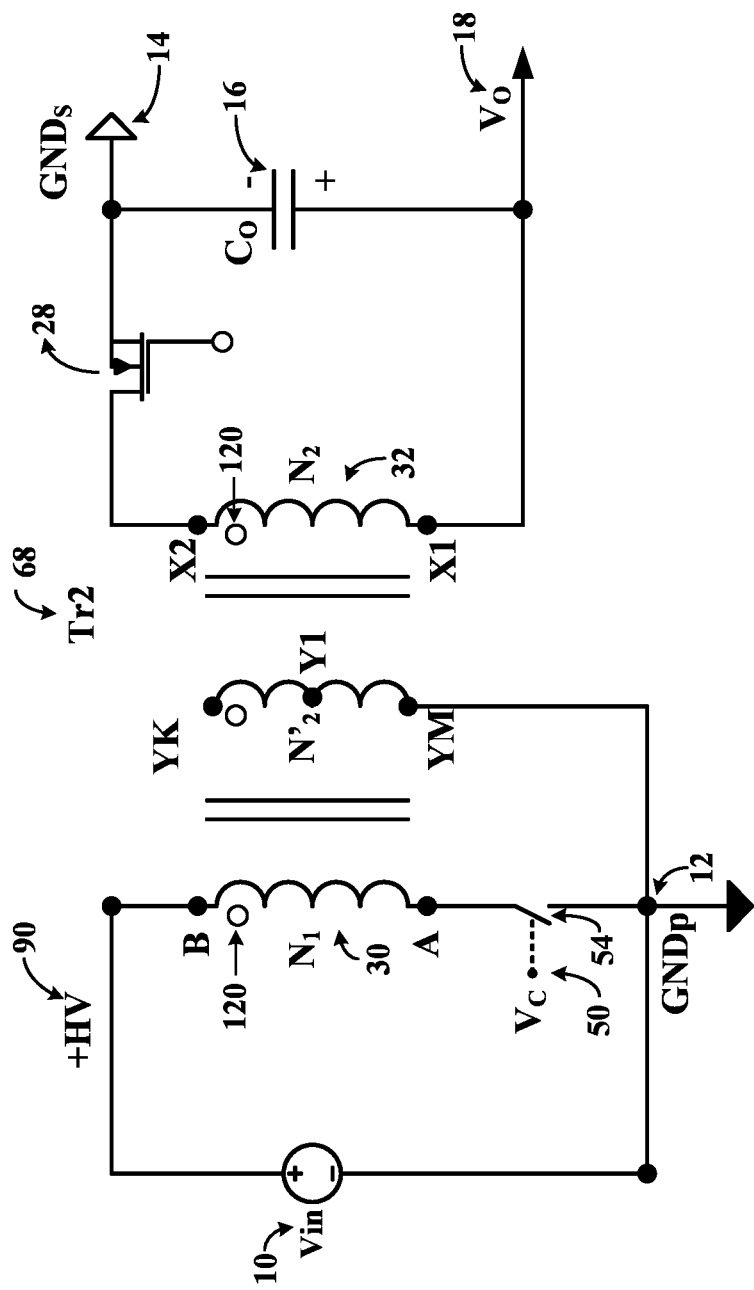
FIG. 15C presents a power train and a transformer structure for a "low side secondary rectifier" and an active shield.
Figure 15D:
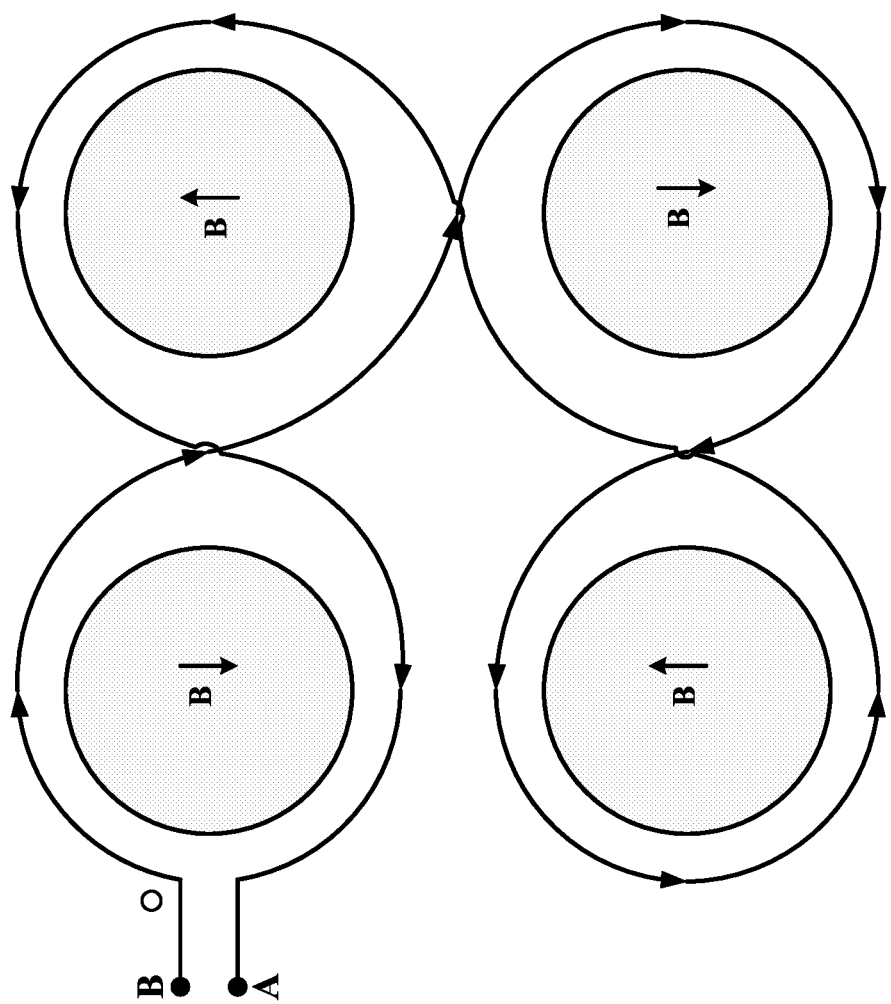
FIG. 15D presents primary winding for the magnetic structure of FIG. 15A.
Figure 15E:
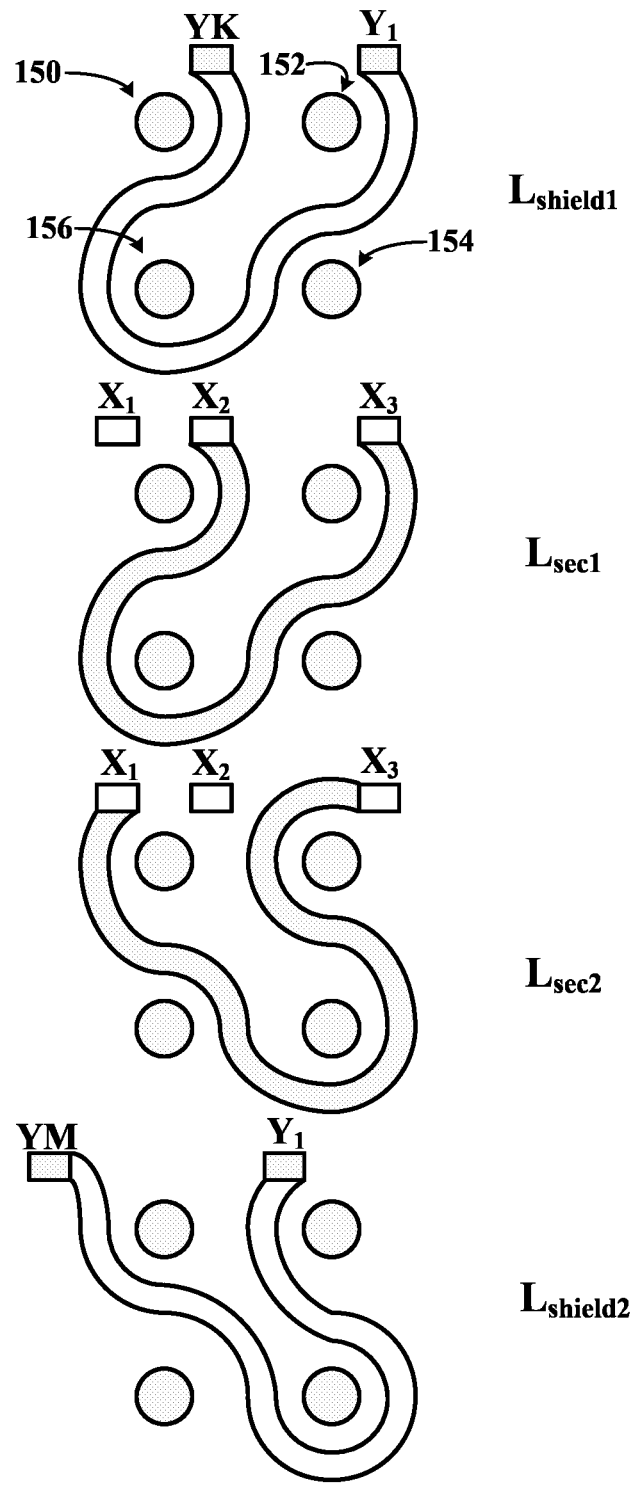
FIG. 15E presents the secondary winding and the active shield winding for the magnetic structure from FIG. 15A.

In FIG. 15C is presented the simplified schematic of a flyback topology employing an active shield using the concept depicted in FIG. 5A. In FIG. 15E are presented four layers of the multilayer transformer using the magnetic core structure from FIG. 15A. As presented in FIG. 15E the secondary windings are implemented in two inner layers, Lsec1 and Lsec2. The shield layers are placed on two layers Lshield1 and Lshield adjacent to the layers in which the secondary windings are embedded. The secondary winding starts from Lsec1 layer, from X2 termination and ends on Lsec2 layer, to the termination X1 with the interconnection between layers X3. X1 termination is connected to the Vo, 18 and X2 termination is connected to the cathode of the synchronized rectifier 28. The active shield starts from YM connection on Lshield2 layer and ends on Lshield1 layer at YK with the interconnection between layersY1. The shield winding on Lshield1 is the mirror imagine of the secondary winding on Lsec1 layer and the shield winding on Lshield 2 is the mirror imagine of the secondary winding Lsec2. The voltage in the termination YK of the shield winding and the voltage in the termination X2 of the secondary winding move with the same polarity and the same amplitude. The termination YM of the shield winding and the termination X1 of the secondary winding are both connected to a quiet termination, GNDp, 12 and respectively Vo, 18, as in the configuration from FIG. 5A. If noise injection is necessary, the termination YM of the active shield will not be connected directly to GNDp, 12. It will be connected to an auxiliary windings of one or more turns wound around one of the four legs and that auxiliary winding termination not connected to the active shield will be connected to the GNDp, 12. The winding direction of the auxiliary winding is chosen to inject a signal in the shield of a polarity designed to reduce the common mode noise. The number of turns for the auxiliary winding will be chosen to have the voltage amplitude that the noise injection via the shield into the secondary winding will reduce the common mode noise.

In an embodiment, a system and method of reducing common-mode noise in a switch mode power supply includes the switch mode power supply having a primary side and a secondary side, a primary side ground and a secondary side ground, the primary side and the secondary side having a quiet termination in which the voltage does not change versus the input ground and versus secondary ground during the operation of the switch mode power supply, and further having an input voltage source, at least one primary switch, a multilayer PCB transformer having a planar magnetic core with multiple legs, and a power output; the transformer having at least a primary winding in the primary side, the primary winding encircling the multiple legs of the planar magnetic core and connected to the input voltage source via the primary switch of the power supply, and at least one secondary winding of the transformer, the secondary winding encircling the multiple legs of the planar magnetic core, on the secondary side of the power supply, wherein the secondary winding connected to the power output via at least one rectifier means; at least two active shields winding adjacent to the secondary winding on both sides of the secondary winding the active shields winding are the mirror imagine of the secondary winding adjacent to them having the same number of turns as the secondary winding and wounded in the same direction as the secondary winding, the active shield windings having two terminations, and one termination of each active shield is connected to the primary quiet termination so that in operation correspondingly adjacent terminations of the secondary winding and the active shield windings carry alternating voltages of the same polarity and same amplitude.

Further, in some embodiments, the connection of the active shield windings to the primary quiet termination is done via an auxiliary winding wound around one of the legs of the planar magnetic core, the auxiliary winding to induce a voltage into the active shield windings designed to be of opposite polarity of the residual common mode noise injected from primary to secondary.

Figure 18:
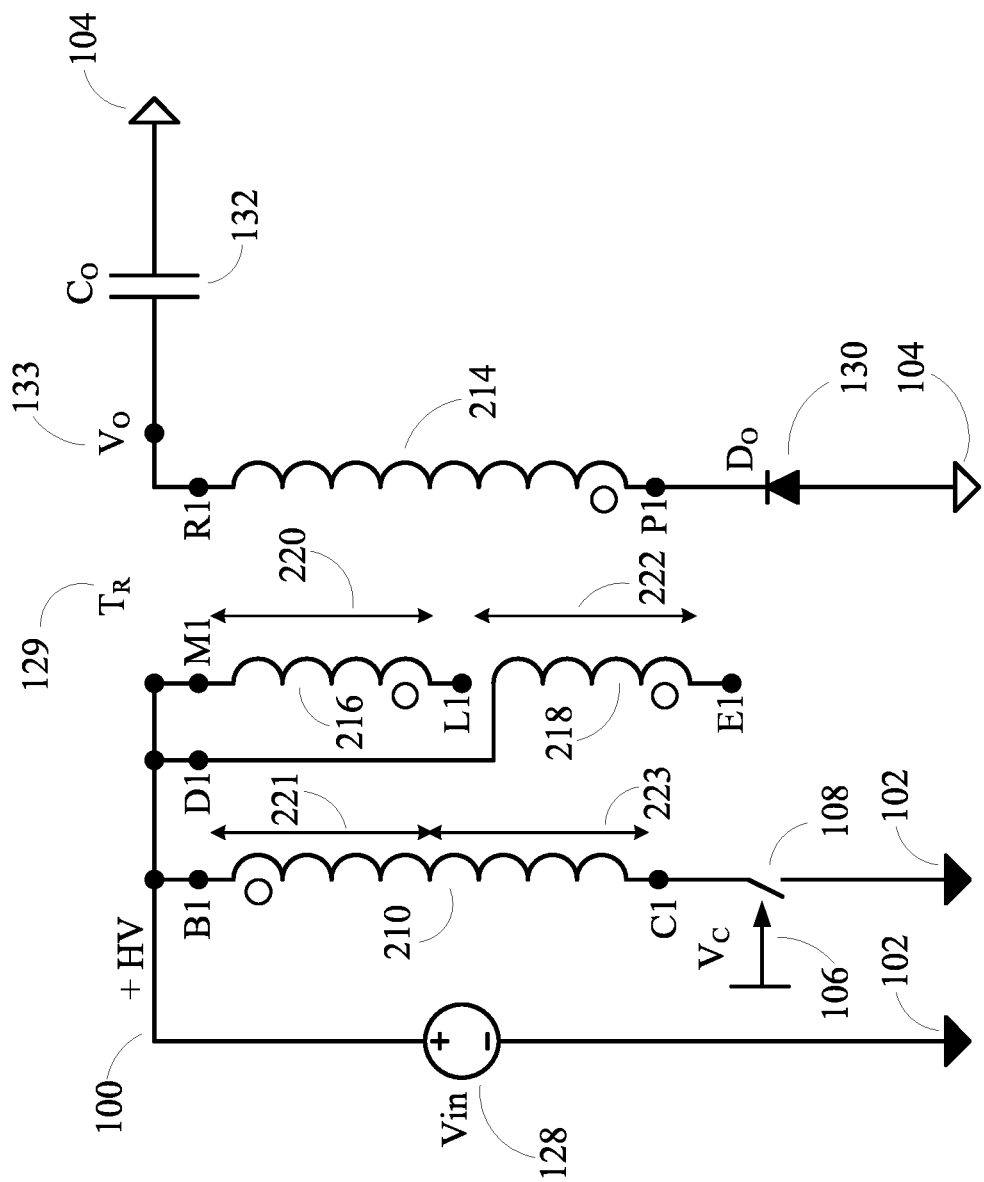
FIG. 18 depicts the power train of the flyback converter with a low rectifier and two partial shields.

The shield in between the primary and secondary is traditionally implemented by an isolated one turn copper foil on which a connection wire is electrically connected and said connection winding is further connected to a quiet spot in primary such as primary ground or bulk voltage, HV,100 as is depicted in FIG. 18. One turn copper shield, cannot follow the spirit of the application Ser. No. 16/732,240, filled on Dec. 31, 2019, which offer significant improvement over the traditional one turn copper shield. The shielding technique used in said patent application is implemented by using a number of turns implemented by using several strands of wire in parallel. Ideally would be that the active shield from said patent application to cover the entire winding area of the bobbin. A large multiple strands of wire creates challenges in manufacturing. The most common and cost competitive is to use only three strands of wire. In order to cover the winding area of the bobbin, an increased number of turns may be required for the active shield. An increased number of turns for the shield will decrease the effectiveness of the shield due an increased impedance to the said quiet spot. One potential solution is to decrease the height of the bobbin but in this case the leakage inductance of the transformer will increase and will increase the DC impedances of the windings by limiting the winding space.

This patent application presents several embodiments in which the limitations associated with the number of strands are addressed. In this patent application we will use a novel concept referred in this application as "partial shields".

In FIG. 18 is presented the power train of a flyback converter composed by an input voltage source Vin, 128, a transformer structure TR, 129, which includes a magnetic core, and the transformer windings, such as the primary winding 210, which is connected to the input voltage source, 128, and to the primary switch 108, controlled by control signal,106. The positive terminal of the Vin is also referred in the field as the bulk voltage, HV, 100. The flyback transformer contains also the secondary winding 214 which is connected to an output rectifier means such as diode Do,130. The output rectifier means can be also implemented by the use of a synchronous rectifier. In series with the rectifier means there is an output capacitor Co, 132, which has one terminal connected to the output ground, 104. The other terminal of the output capacitor is further connected to the output load and that terminal is also referred in this patent as output voltage, Vo, 133. The output load it is connected between Vo, 133 and the output GND, 104.

The circuit configuration of the flyback converter presented in FIG. 18 is referred in the field as a low side secondary rectifier. In this configuration the dot termination of the secondary winding is placed to the cathode of the rectifier means. The dots placed in the windings of the transformer represent the polarity of the windings. When a voltage is applied to a winding in a transformer with the positive polarity at the dot, the rest of the winding will have a positive polarity induced at the dot as well.

Embodiment #1, for low side output rectifier.

When the primary switch 108 turns on and off the voltage at the primary winding terminal C1, swings in between zero voltage level to a high voltage level which is Vin+N*Vo, wherein N is the turns ratio between the primary winding 210 and the secondary winding 214 and Vo is the voltage across the output capacitor Co, 132. The transitions between zero voltage and Vin+N*Vo is done with very high dV/dt which creates displacement current in between the primary winding and the secondary winding via the parasitic capacitance between the primary winding and the secondary winding.

The purpose for the shield winding is to shield the secondary winding from the displacement current injected by the primary winding. The displacement current from the primary winding and shield winding will return to the primary ground, and for this purpose the shield windings are connected to a quiet spot in primary such as input ground or the HV bulk, 100.

The largest voltage swing in the primary is at the connection going to the primary switch 108. That connection in FIG. 18 is C1. The voltage swing decreases per each turn as it gets closer the other termination of the primary winding, becoming zero at the termination B1. In order to protect the secondary wining, 214, from the displacement current injection from the primary winding, a first shield 218, is placed between the primary winding, 210, and the secondary winding, 214. The shield 218 is designed to shield the secondary from the displacement current coming form the section,223, of the primary winding wherein the voltage swing is the largest. Due to the limitation of the number of parallel strands and the need to have a given number of turns in the shield 218, in a certain ratio with the secondary winding, 214, the winding area of the shield, 222, will only partially cover the secondary winding, 214.

The polarity of the shield is done in a such way that the shield winding, 218, will move with the same polarity as the secondary winding. However, the termination D1 of the shield winding, 218, is placed to a quiet spot which is the HV, 100. D1 can be also connected to the input ground, 102. The shield technique of FIG. 18 in this patent application it is similar with the one depicted in FIG. 5A, filled on Dec. 31, 2019, with the exception that the shield winding, 218 covers only a portion of the secondary winding,214. Because of the partial coverage, the tunning of the number of turns in 218, will not have to follow the methodology of the patent application Ser. No. 16/732,240, wherein the number of turns in the shield is equal with the number of turns in the secondary winding. In the present patent application, there is a deliberate mismatch in between the number of turns in the secondary winding 214 and the shield winding, 218, in order to create displacement current that is opposite a polarity and the same amplitude of a residual common mode noise injected from the primary winding to the secondary winding.

The section of the secondary winding, 220, it is not covered by the shield 218. Another shield is placed to cover for that section, which is the shield 216. The polarity of the shield 216, is the same as the secondary winding in order for the shield winding and the secondary windings to swing with the same polarity. One termination of the shield 216 is connected to a quiet spot such as HV, which can be also the primary ground. The winding in both shields, 218 and 216, swing with the same polarity as the secondary wining. The shield 216 which is tight to a quit spot, via M1 terminal, overlaps with the termination R1 of the secondary winding, which is also connected to a quiet spot, Vo. The number of turns in 216 can be chosen to be the same as the secondary winding in the area 220, wherein the shield 216 and secondary winding, 214, overlaps. The partial shield 216 and the windings of the secondary, 214, contained in the area 220, can function as per main embodiment of the patent application Ser. No. 16/732,240, wherein the shield winding and the secondary winding swing with the same polarity and amplitude. Due to the fact that the termination D1 of the shield 218 is placed to a quiet spot and the adjacent winding in the secondary, 214, do have a voltage swing, a controlled noise injection is necessary in order to significantly reduce the displacement current between the secondary wining 214, and the shield winding 218. One solution is to have the number of turns in the shield 218 different than the number of urns in the secondary wining contained in the winding area 222. The difference of the number of turns between the shield 218 and the number of turns of the secondary wining contained in the winding section 222, creates a method of tunning the displacement current in between primary and secondary to be in opposite a polarity of a residual common mode noise injected from the primary winding to the secondary winding. Another method of noise cancellation is by tunning the number of turns in the shield 216, which can be chosen to be different from the number of turns from the secondary winding wound in the winding area 220 with the purpose that the displacement current between primary and secondary to be in opposite as polarity and the same amplitude of a residual common mode noise injected from the primary winding to the secondary winding.

In embodiment #1 of this invention, two independent shields are placed in between the primary and secondary, each one covering a section of the bobbin. Both said shields have windings swinging with the same polarity as the secondary winding, and by tailoring the number of turns in each said independent shields a displacement current is injected in between the primary and the secondary, having an opposite polarity and the same amplitude of a residual common mode noise injected from the primary winding to the secondary winding.

Embodiment #2, for high side output rectifier.

Figure 19:
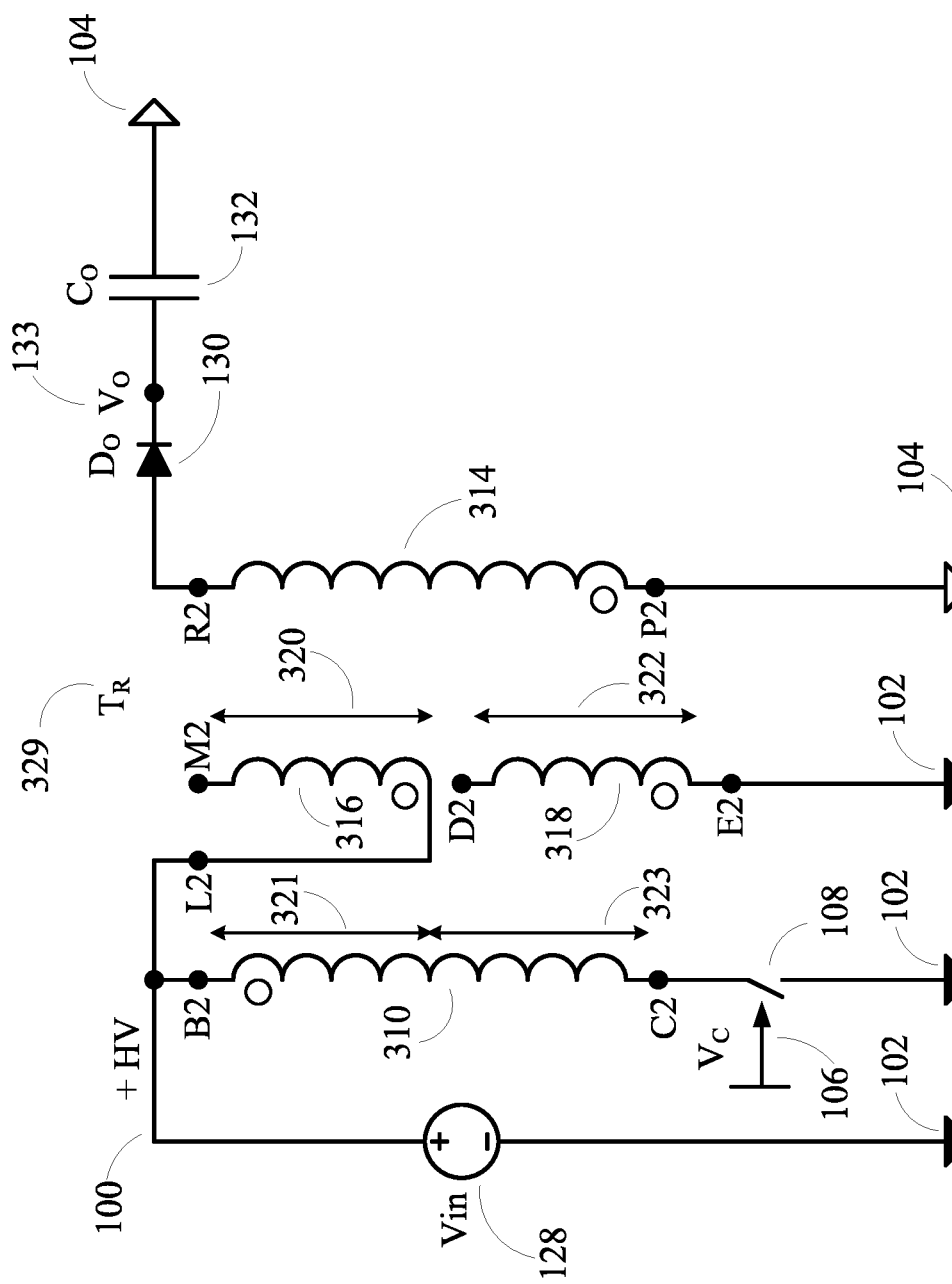
FIG. 19 depicts the power train of the flyback converter with a high rectifier and two partial shields.

In FIG. 19 is depicted a winding arrangement in a flyback transformer TR, 329, in a high side rectifier configuration, using two partial shields. The first partial shield, 318, is placed between the primary wining and secondary winding, said partial shield covering the section 323, of the primary winding and the area 322 of the secondary winding. The area 323, of the primary wining is the area which has the largest voltage swing in the primary winding, because is connected to the main switch, 108. The partial shield 318 is connected with the dot end termination, E2 to the primary ground 102. The other termination D2 of the first partial shield 318, is not connected. The secondary winding 314, has the dot at the termination P2, which is also connected to a quiet spot which is output ground 104. The partial shield winding 318 and the secondary winding 314, has the windings with the same voltage swing polarity. The terminal E2 of the shield 318, is connected to a quiet spot, the input ground and the terminal P2 of the secondary wining is also connected to a quiet spot which is the output ground 104. Both windings, 318 and 314, have the dot connected to a quiet spot and these terminals are adjacent to each other.

The second partial shield 316, has the dot termination L2, which is connected to a quiet spot HV, 100. The second termination M2 is not connected. The second shield does cover the winding area 320 of the secondary winding 314.

Due to the fact that the termination L2 of the shield 316 is placed to a quiet spot and the adjacent winding in the secondary, 314, does have a voltage swing, a displacement current will occur in between the shield 316 and the secondary winding 314. As a result, a controlled noise injection is necessary in order to significantly reduce the total displacement current between the secondary winding 314 and primary ground. One solution is to have the number of turns in the shield 318 different than the number of urns in the secondary wining contained in the winding area 322. The difference of the number of turns between the shield 318 and the number of turns of the secondary wining contained in the winding section 322, is a method of tunning the displacement current in between primary and secondary to be in opposite a polarity and the same amplitude of a residual common mode noise injected from the primary winding to the secondary winding. The number of turns in the shield 316, can be also chosen to be different from the number of turns from the secondary winding wound in the winding area 320 with the purpose that the displacement current between primary and secondary to be in opposite as polarity and the same amplitude of a residual common mode noise injected from the primary winding to the secondary winding.

In embodiment #2 of this invention, two independent shields are placed in between the primary and secondary, each one covering a section of the bobbin. Both said shields have windings swinging with the same polarity as the secondary winding, and by tailoring the number of turns in each said independent shields a displacement current is injected in between the primary and the secondary, having an opposite polarity and the same amplitude as the residual common mode noise injected from the primary winding to the secondary winding.

Embodiment #3, for a low side output rectifier.

Figure 20:
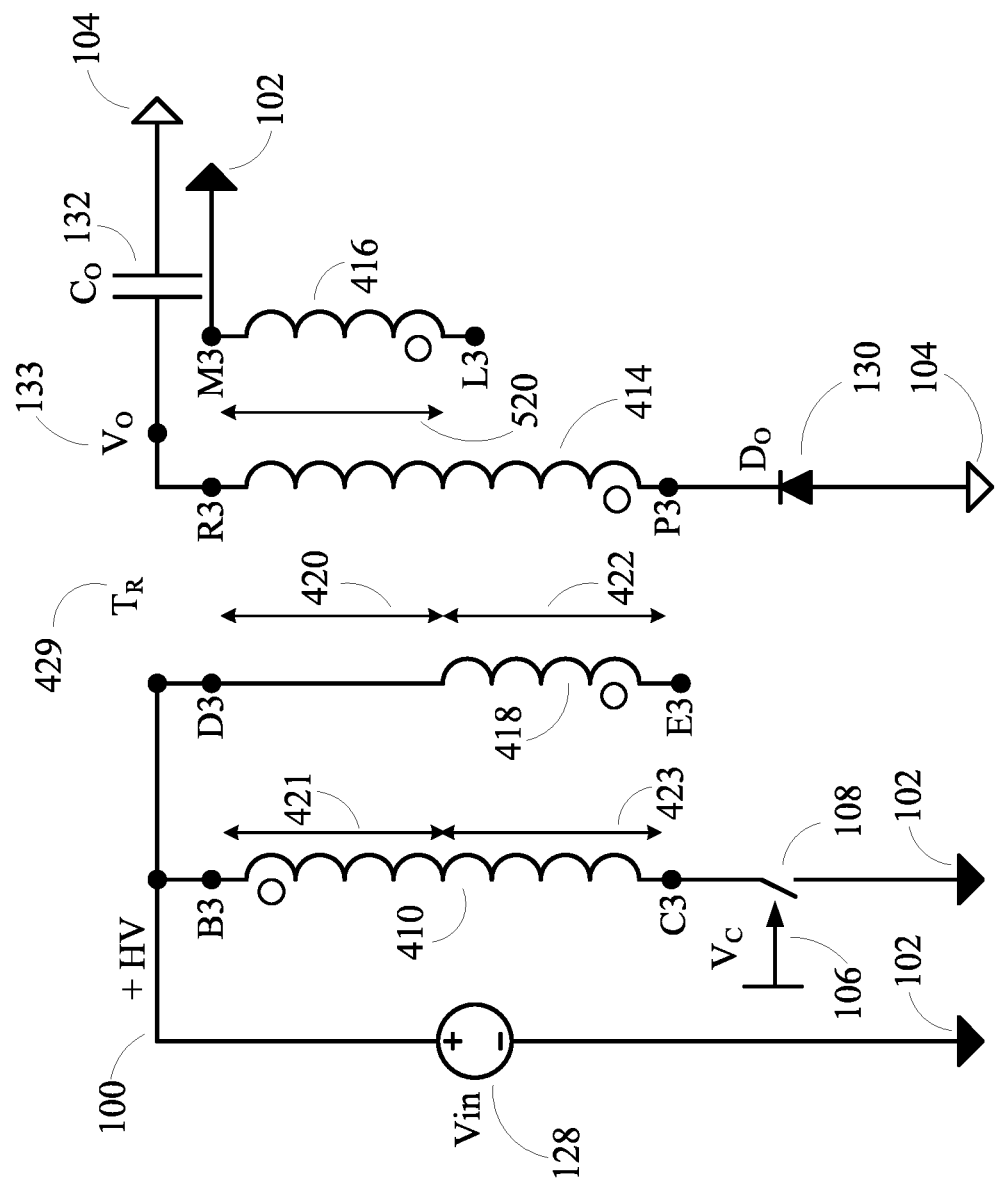
FIG. 20 depicts the power train of the flyback converter with a low rectifier and one partial shield and one noise injection winding.

In FIG. 20 is depicted a winding arrangement in a flyback transformer TR, 429, in a low side rectifier configuration, using two partial shields. The first partial shield, 418, is placed between the primary wining and secondary winding, partial shield covering the section 423, of the primary winding and the area 422 of the secondary winding. The area 423, of the primary wining is the area which has the largest voltage swing in the primary winding, because is connected to the termination C3, which is connected to the main switch, 108. The partial shield 418 has the dot end termination, E3, not connected. The other termination D3 is connected to the quiet spot, HV, 100. The secondary winding 414, has the dot at the termination P3, which is connected to the cathode of output diode Do, 130. The partial shield winding 418 and the secondary winding 414, has the windings with the same voltage swing polarity. The terminal D3 of the shield 418, is connected to a quiet spot, the HV, 100, at the terminal D3. Both windings, 418 and 414 have the non-dot connected to a quiet spot and these terminals are not adjacent to each other. As a result, a displacement current will be injected in between the secondary winding, 414 and the HV, 100, which is part of the primary. In addition to that there is another displacement current between the primary winding 410, and the area of the secondary winding, 420, which is not covered by a shield.

There is another shield 416, which covers the secondary winding over the area 520, which is not in between primary and secondary winding, as a result the winding 416, does not play the role of a shield. The winding 416 acts not as a shield but as a controlled noise injection. The noise injected by the winding 416, has the role of injecting a displacement current in between the secondary winding and the primary which is to be in opposite as polarity and the same amplitude as the residual common mode noise injected from the primary winding to the secondary winding. In conclusion in this embodiment of the invention, here is a partial shield in between the noisiest section of the primary winding, 423, of the primary and the section 422 of the secondary winding. There is not a partial shield in between the primary winding 410, and the secondary winding 414, in the winding area 420 of the secondary winding. As a result, a displacement current will occur in between the secondary winding in the area 420 and the primary winding in the area of 421. To compensate for this displacement, current a controlled noise injection is produced by the winding 416, with the purpose to produce a displacement current between primary and secondary to be in opposite as polarity and the same amplitude as the residual common mode noise injected from the primary winding to the secondary winding.

In embodiment #3 of this invention, one independent shields is placed in between the primary and secondary to cover the section of the primary with the largest voltage swing which is connected to the primary switch. Another noise injection winding is placed above the secondary winding in the area not covered by the first partial shield, but not in between the primary and secondary but above the secondary winding. Said noise injection winding is tailored to inject a displacement current between primary and secondary winding, said displacement current having an opposite polarity and the same amplitude as the residual common mode noise injected from the primary winding to the secondary winding.

Embodiment #4, for a high side output rectifier.

Figure 21:
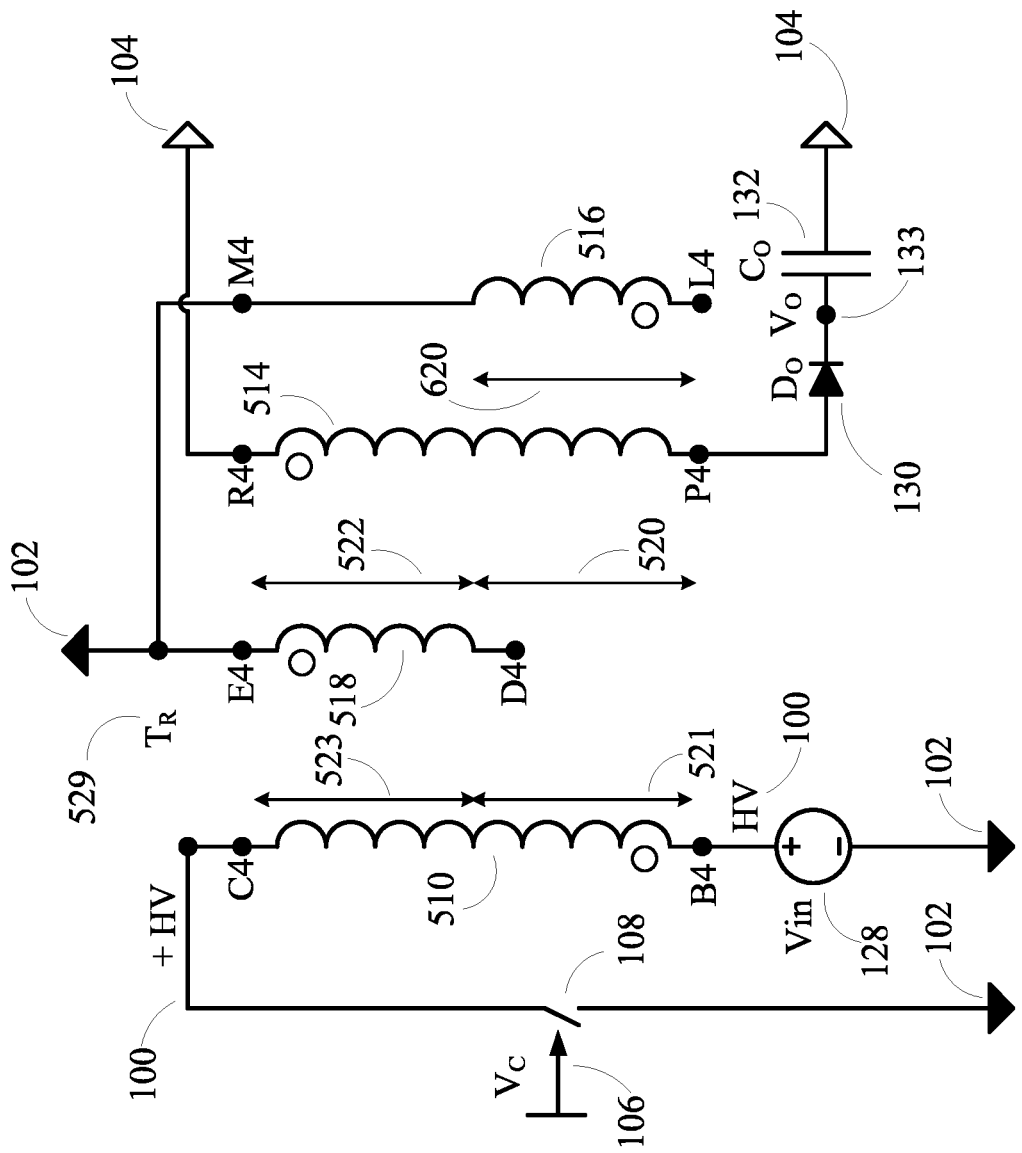
FIG. 21 depicts the power train of the flyback converter with a low rectifier and one partial shield and one noise injection winding.

In FIG. 21 is depicted a winding arrangement in a flyback transformer TR, 529, in a high side rectifier configuration, using two partial shields. The first partial shield, 518, is placed between the primary winding and secondary winding, partial shield covering the section 523, of the primary winding and the area 522 of the secondary winding. The area 423, of the primary wining is the area which has the largest voltage swing in the primary winding, because is connected to the termination C4, which is connected to the main switch, 108. The partial shield 518 is connected with the dot end termination, to the input ground. The other termination D4 is not connected. The secondary winding 514, has the dot at the termination P4, which is connected to a quiet spot which is output ground. The partial shield winding 518 and the secondary winding 514, has the windings with the same voltage swing polarity. Both terminations at the dot end of the first partial shield winding 518 and the secondary winding 514 are connected to a quiet spot, in primary, the input ground and a quiet spot in the secondary, output ground 104. Both windings, 518 and 514 have the dot connected to a quiet spot and these terminals are adjacent to each other. As a result, no displacement current will be injected in between the secondary winding, 514 and the partial shield 518 in the event wherein the number of turns in the partial shield 518 and the number of turns in the secondary winding covered by the area 522 is the same. The number of turns in the partial shield 518 and the number of turns in the secondary winding covered by the partial shield, can be controlled in such way that the displacement current can be generated, to suppress the total common mode noise between primary and secondary.

There is another displacement current between the primary winding 510, and the area of the secondary winding, 514, which is not covered by a shield 518 which has to be cancelled.

There is another partial shield 516, which covers the secondary winding over the area 620, which however it is not in between primary and secondary winding, as a result the winding 516, does not play the role of a shield. The winding 516 acts not as a shield but as a controlled noise injection. The noise injected by the winding 516, has the role of injecting a displacement current in between the secondary winding and the primary which is to be in opposite as polarity and amplitude of a residual common mode noise injected from the primary winding to the secondary winding. In conclusion in this embodiment of the invention there is a partial shield, 518, in between the most noisy section of the primary winding, 523, of the primary and the section 522 of the secondary winding, 514. There is not a partial shield in between the primary winding 510, and the secondary winding 514, in the winding area 520 of the secondary. As a result, a displacement current will occur in between the secondary winding in the area 520 and the primary winding in the area of 421. To compensate for this displacement, current a controlled noise injection is produced by the winding 416, with the purpose to produce a displacement current between primary and secondary to be in opposite as polarity and the same amplitude of a residual common mode noise injected from the primary winding to the secondary winding.

In embodiment #4 of this invention, one independent shields is placed in between the primary and secondary to cover the section of the primary with the largest voltage swing which is connected to the primary switch. Another noise injection winding is placed above the secondary winding in the area not covered by the first partial shield, but not in between the primary and secondary but above the secondary winding. Said noise injection winding is tailored to inject a displacement current between primary and secondary winding having an opposite polarity and the same amplitude as the residual common mode noise injected from the primary winding to the secondary winding.

Embodiment #5, for a high side output rectifier and interleaved primary and secondary winding.

Figure 22:
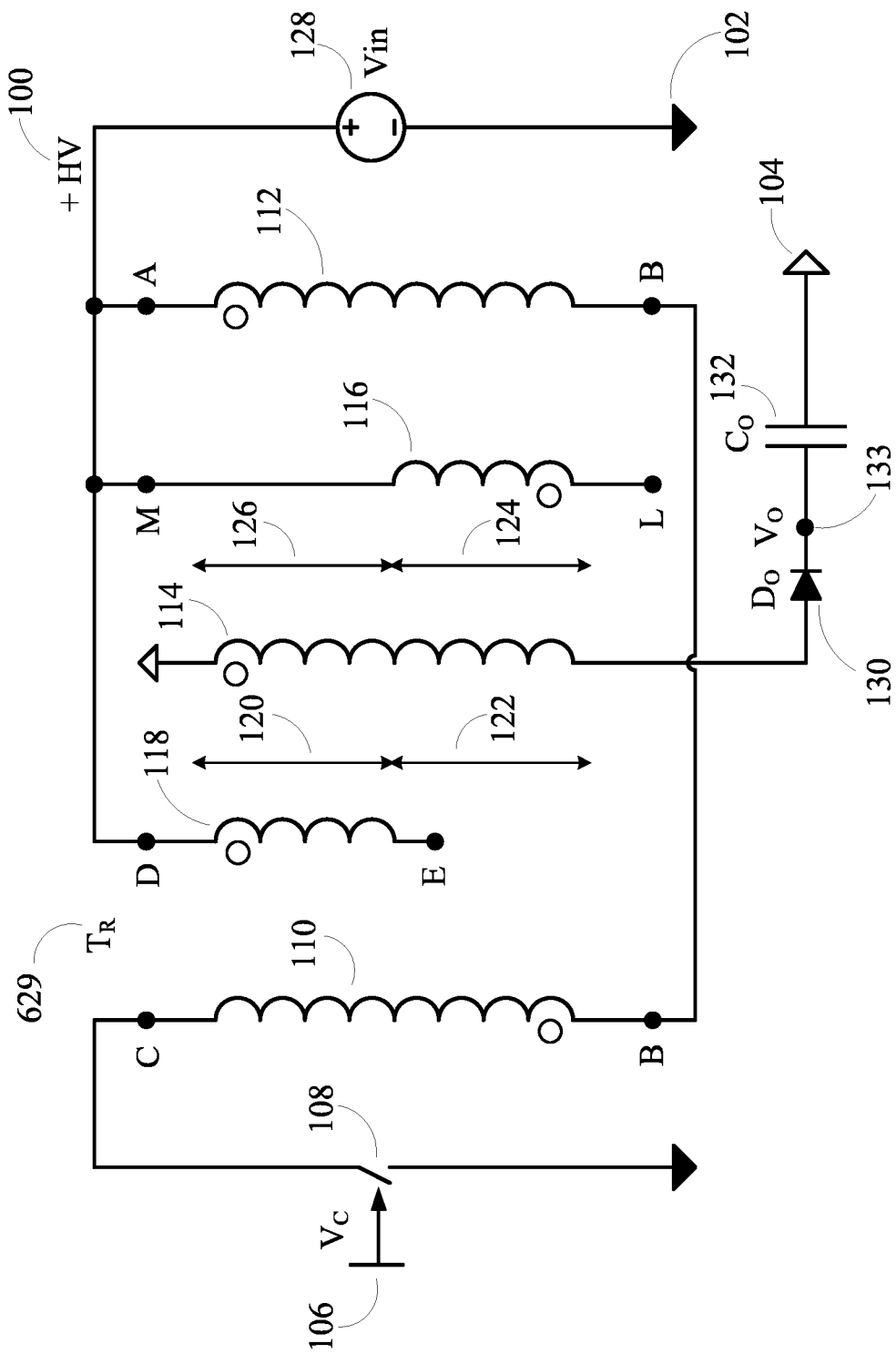
FIG. 22 depicts the power train of the flyback converter with high output rectifier and interleaved configuration and two partial shields.

In FIG. 22 is depicted a winding arrangement in a flyback transformer TR, 629, in a high side rectifier configuration, using two partial shields and wherein the secondary winding is contained between two section of the primary, structure which is referred in this patent application as interleaved configuration. The first partial shield, 118, is placed between the primary wining and secondary winding, partial shield covering the section 120, of the secondary winding. The partial shield, 118 is placed in between the section of the primary winding connected to terminal C, further connected to the primary switch 108, section which has the largest voltage swing amplitude. The partial shield 118 is connected with the dot end termination to a quiet spot which is the HV, 100, of the input voltage source, Vin, 128. The other termination of the partial shield 118, E is not connected. The secondary winding 114, has the dot at the termination connected to a quiet spot which is output ground, 104. The partial shield winding 118 and the secondary winding 114, has the windings with the same voltage swing polarity. Bothe terminations at the dot end of the first partial shield winding 118 and the secondary winding 114 are connected to a quiet spot, in primary, the input ground and a quiet spot in the secondary, output ground 104. In the case the number of turns in the partial shield 118 and the secondary winding under the area 120, are the same no displacement current will be injected in between the secondary winding, 114 and the partial shield 118. By tunning the number of turns in the partial shield 118 and the number of turns in the secondary winding covered by the partial shield, the area 120, some controlled displacement current can be injected, this representing one method of total common mode noise suppression between primary and secondary.

There is another displacement current between the primary winding 110, and the area of the secondary winding, 122, which is not covered by a shield 118. In that area, displacement current will be injected in between the primary winding 110 and secondary winding 114.

There is another shield 116, which covers the secondary winding over the area 124. The winding 116 acts as a shield in between the primary winding 112, and the secondary winding 114, but also as a controlled noise injection. The noise injected by the winding 116, has the role of injecting a displacement current in between the secondary winding and the primary which is in opposite as polarity and the same amplitude of a residual common mode noise injected from the primary winding to the secondary winding. In conclusion in this embodiment of the invention there is a partial shield in between the noisiest section of the primary winding, 523, of the primary and the section 120 of the secondary winding. In this embodiment there are two partial shields in between the primary and secondary, a first shield 118, designed to shield the secondary from the primary winding section which has the largest voltage swing amplitude, and a second shield 116 which shields the secondary winding from another section of the primary winding, 112. The second partial shield 116, acts also as a noise injection, to inject in the secondary winding 114 a displacement current in between the secondary winding, a displacement current to be in opposite as polarity and the same amplitude of a residual common mode noise injected from the primary winding to the secondary winding.

Figure 23:
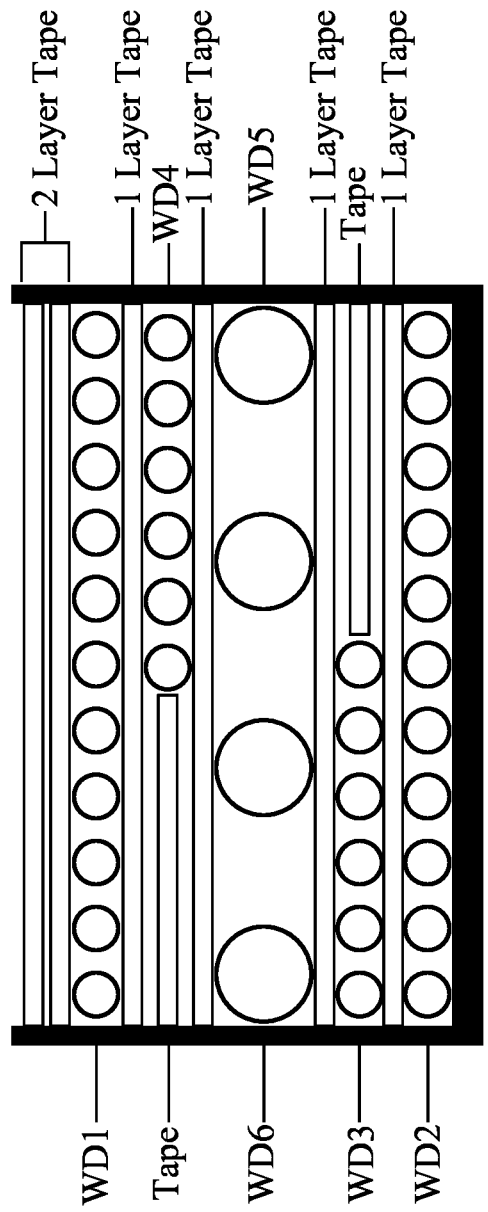
FIG. 23 depicts the Embodiment No. 5, implementation in a bobbin.

In FIG. 23 is depicted the winding configuration in the bobbin using the embodiment #5. There are 22 turns in the primary winding formed by two 11 turns per layer, 11 turns on the bottom layer and 11 turns on the top layer of the bobbin. The bottom layer is connected to the primary switch and the top layer is connected to the HV, 100. In FIG. 23 is presented also the dual partial shield one on the layer 2 and one on the layer 4.

Figure 24:
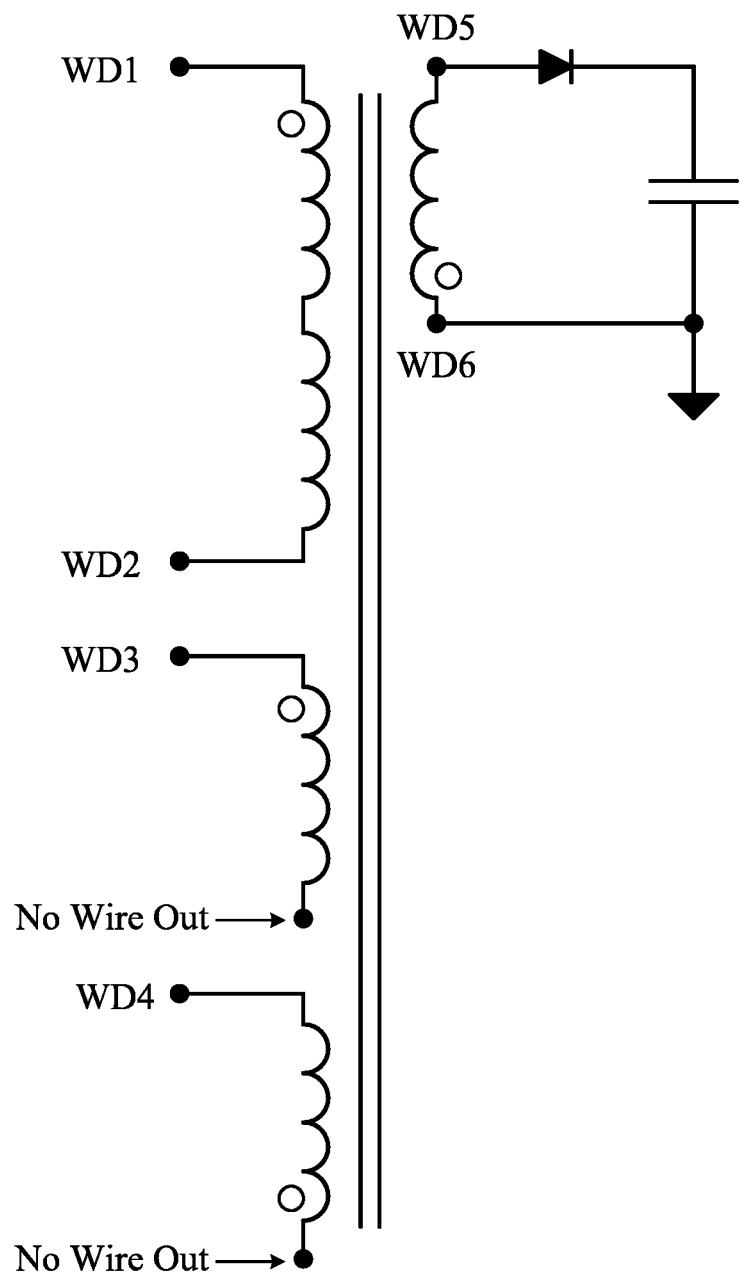
FIG. 24 depicts the transformer drawing of the Embodiment No. 5.

In FIG. 24 is depicted the electrical schematic of the transformer from the embodiment #5.

In embodiment #5 of this invention, a first partial shields is placed in between the primary and secondary to cover the section of the primary with the largest voltage swing which is connected to the primary switch. Another partial shield is placed between the secondary winding in the area not covered by the first partial shield. Said second partial shield is tailored to inject a displacement current between primary and secondary winding a current having an opposite polarity and the same amplitude as the residual common mode noise injected from the primary winding to the secondary winding.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A system for reducing common-mode noise, the system comprising:
a switch mode power supply including primary and secondary sides, primary and secondary side grounds, an input voltage source, a primary switch, a transformer having a magnetic core, and a power output, wherein the primary side and the secondary side each have at least a quiet termination wherein a voltage does not change with respect to the primary side ground and with respect to the secondary side ground;
the transformer includes a primary winding on the primary side connected to the input voltage source via the primary switch, and a secondary winding on the secondary side connected to the power output via a rectifier means, wherein the secondary winding has a first section and a second section;
first and second partial active shields, wherein the first partial active shield overlaps the first section of the secondary winding, and the second partial active shield overlaps the second section of the secondary winding;
wherein the first partial active shield winding is placed between the primary winding and the first section of the secondary winding, and the second partial active shield is placed between the primary winding and the second section of the secondary winding, and each of the first and second partial active shield windings has two terminations, are wound in a same direction as the secondary winding;
wherein the first and second partial active shields and the secondary winding have a number of turns; and
one of the two terminations of the first and the second partial active shield windings is connected to a quiet termination on the primary side, so that the terminations of the secondary windings and the first and second active shield windings that are adjacent each other carry alternating voltages of a same polarity such that there is a displacement current flowing in between the first and second partial active shield and the secondary winding, so that a common mode current from the primary side ground to the secondary side ground is zero.

2. The system of claim 1, wherein the number of turns of the first partial active shield is equal to the number of turns of the secondary winding contained in the first section of the secondary winding, so as to induce a voltage into the secondary winding such that no common mode current flows in between the primary and secondary side grounds.

3. The system of claim 1, wherein the number of turns of the second partial active shield is equal to the number of turns of the secondary contained in the second section of the secondary winding, so as to induce a voltage into the secondary winding such that no common mode current flows in between the primary and secondary side grounds.

4. The system of claim 1, wherein the number of turns of the first partial active shield is different from the number of turns of the secondary winding contained in the first section of the secondary winding, and the number of turns of the second partial active shield is different from the number of turns of the secondary winding contained in the second section of the secondary winding, so as to induce a voltage into the secondary winding such that no common mode current flows in between the primary and secondary side grounds.

5. The system of claim 1, wherein the transformer is implemented in a multilayer printed circuit board (PCB).

6. A system for reducing common-mode noise, the system comprising:
- a switch mode power supply including primary and secondary sides, primary and secondary side grounds, an input voltage source, a primary switch, a transformer having a magnetic core, and a power output, wherein the primary side and the secondary side each have at least a quiet termination wherein a voltage does not change with respect to the primary side ground and with respect to the secondary side ground;
- the transformer includes a primary winding on the primary side connected to the input voltage source via the primary switch, a secondary winding on the secondary side connected to the power output via a rectifier means, wherein the secondary winding has a first section and a second section;
- first and second partial active shields, wherein the first partial active shield overlaps the first section of the secondary winding, and the second partial active shield overlaps the second section of the secondary winding;
- wherein the first partial active shield winding is placed between the primary winding and the first section of the secondary winding, and the second partial active shield is placed between the primary winding and the second section of the secondary winding, and each of the first and second active shield windings has two terminations, wherein the first partial active shield is wound in a same direction as the secondary winding and occupies the same axial position on the core as the secondary winding, and wherein the second partial active shield is wound in an opposite direction as the secondary winding;
- wherein the first and second partial active shields and the secondary winding have a number of turns; and
- one of the two terminations of the first and the second partial active shield windings is connected to a quiet termination on the primary side, so that the terminations of the secondary windings and the first and second active shield windings that are adjacent each other carry alternating voltages such that there is a displacement current flowing in between the first and second partial active shield and the second winding, so that a common mode current from the primary side ground to the secondary side ground is zero.

7. The system of claim 6, wherein the number of turns of the first partial active shield is equal to the number of turns of the secondary winding contained in the first section of the secondary winding, so as to induce a voltage into the secondary winding such that no common mode current flows in between the primary and secondary side grounds.

8. The system of claim 6, wherein the number of turns of the second partial active shield is equal to the number of turns of the secondary winding contained in the second section of the secondary winding, so as to induce a voltage into the secondary winding such that no common mode current flows in between the primary and secondary side grounds.

9. The system of claim 6, wherein the number of turns of the first partial active shield is different from the number of turns of the secondary winding contained in the first section of the secondary winding, and the number of turns of the second partial active shield is different from the number of turns of the secondary winding contained in the second section of the secondary winding, so as to induce a voltage into the secondary winding such that no common mode current flows in between the primary and secondary side grounds.

10. The system of claim 6, wherein the transformer is implemented in a multilayer printed circuit board (PCB).

11. A system for reducing common-mode noise, the system comprising:
- a switch mode power supply including primary and secondary sides, primary and secondary side grounds, an input voltage source, a primary switch, a transformer having a magnetic core, and a power output, wherein the primary side and the secondary side each have at least a quiet termination wherein a voltage does not change with respect to the primary side ground and with respect to the secondary side ground;
- the transformer includes a primary winding on the primary side connected to the input voltage source via the primary switch, and a secondary winding on the secondary side connected to the power output via a rectifier means, wherein the secondary winding has a first section and a second section;
- first and second active partial shields, wherein the first partial active shield overlaps the first section of the secondary winding, and the second partial active shield overlaps the second section of the secondary winding;
- wherein the primary winding is split between a first section of the primary winding and a second section of the primary winding, the first partial active shield winding is placed between the first section of the primary winding and the first section of the secondary winding, the second partial active shield winding is placed between the second section of the primary winding and the second section of the secondary winding, and each of the first and second active shield windings has two terminations, is wound in a same direction as the secondary winding;
- wherein the first and second partial active shields and the secondary winding have a number of turns; and
- one of the two terminations of the first and the second partial active shield windings is connected to a quiet termination on the primary side, so that the terminations of the secondary windings and the first and second active shield windings that are adjacent each other carry alternating voltages of a same polarity such that there is a displacement current flowing in between the first and second partial active shield and the second winding, so that a common mode current from the primary side ground to the secondary side ground is zero.

12. The system of claim 11, wherein the number of turns of the first partial active shield is equal to the number of turns of the secondary winding contained in the first section of the secondary winding, so as to induce a voltage into the secondary winding such that no common mode current flows in between the primary and secondary side grounds.

13. The system of claim 11, wherein the number of turns of the second partial active shield is equal to the number of turns of the secondary winding contained in the second section of the secondary winding, so as to induce a voltage into the secondary winding such that no common mode current flows in between the primary and secondary side grounds.

14. The system of claim 11, wherein the number of turns of the first partial active shield is different from the number of turns of the secondary winding contained in the first section of the secondary winding, and the number of turns of the second partial active shield is different from the number of turns the number of the secondary winding contained in the second section of the secondary winding so as to induce a voltage into the secondary winding such that no common mode current flows in between the primary and secondary side grounds.

15. The system of claim 11, wherein the transformer is implemented in a multilayer printed circuit board (PCB).

16. A system for reducing common-mode noise, the system comprising:
- a switch mode power supply including primary and secondary sides, primary and secondary side grounds, an input voltage source, a primary switch, a transformer having a magnetic core, and a power output, wherein the primary side and the secondary side each have at least a quiet termination wherein a voltage does not change with respect to the primary side ground and with respect to the secondary side ground;
- the transformer includes a primary winding on the primary side connected to the input voltage source via the primary switch, a secondary winding on the secondary side connected to the power output via a rectifier means, wherein the secondary winding has two sections, a first and a second section;
- first and second active partial shields, wherein the first partial active shield overlaps the first section of the secondary winding, and the second partial active shield overlaps the second section of the secondary winding;
- wherein the primary winding is split between a first section of the primary winding and a second section of the primary winding, the first partial active shield winding is placed between the first section of the primary winding and the first section of the secondary winding secondary winding, and the second partial active shield winding is placed between the second section of the primary winding and the second section of the secondary winding;
- wherein the first partial active shield winding is placed between the first section of the primary winding and the first section of the secondary winding, and the second partial active shield is placed between the second section of the primary winding and the second section of the secondary winding and each of the first and second active shield windings has two terminations, wherein the first partial active shield is wound in a same direction as the secondary winding, and wherein the second partial active shield is wound in an opposite direction as the secondary winding, and occupies the same axial position on the core as the secondary winding;
- wherein the first and second partial active shields and the secondary winding have a number of turns; and
- one of the two terminations of the first and the second partial active shield windings is connected to a quiet termination on the primary side, so that the terminations of the secondary windings and the first and second active shield windings that are adjacent each other carry alternating voltages such that there is a displacement current flowing in between the first and second partial active shield and the second winding, so that a common mode current from the primary side ground to the secondary side ground is zero.

17. The system of claim 16, wherein the number of turns of the first partial active shield is equal to the number of turns of the secondary winding contained in the first section of the secondary winding, so as to induce a voltage into the secondary winding such that no common mode current flows in between the primary and secondary side grounds.

18. The system of claim 16, wherein the number of turns of the second partial active shield is equal to the number of turns of the secondary winding contained in the second section of the secondary winding, so as to induce a voltage into the secondary winding such that no common mode current flows in between the primary and secondary side grounds.

19. The system of claim 16, wherein the number of turns of the first partial active shield is different from the number of turns of the secondary winding contained in the first section of the secondary winding, and the number of turns of the second partial active shield is different from the number of turns of the secondary winding contained in the second section of the secondary winding, so as to induce a voltage into the secondary winding such that no common mode current flows in between the primary and secondary side grounds.

20. The system of claim 16, wherein the transformer is implemented in a multilayer printed circuit board (PCB).

* * * * *